US008052274B2

(12) United States Patent
Sekiya

(10) Patent No.: US 8,052,274 B2
(45) Date of Patent: Nov. 8, 2011

(54) INK-JET RECORDING APPARATUS, INK-JET COPIER AND RECORDING MEDIUM

(75) Inventor: Takuro Sekiya, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 12/685,301

(22) Filed: Jan. 11, 2010

(65) Prior Publication Data

US 2010/0110123 A1 May 6, 2010

Related U.S. Application Data

(63) Continuation of application No. 12/239,352, filed on Sep. 26, 2008, now Pat. No. 7,673,980, which is a continuation of application No. 10/690,296, filed on Oct. 21, 2003, now Pat. No. 7,445,326.

(30) Foreign Application Priority Data

Oct. 22, 2002 (JP) ................................ 2002-307539
Jul. 24, 2003 (JP) ................................ 2003-201191

(51) Int. Cl.
*B41J 2/01* (2006.01)
*G01D 11/00* (2006.01)

(52) U.S. Cl. ........... 347/102; 347/101; 347/100; 347/96

(58) Field of Classification Search .................. 347/100, 347/102, 95, 96, 103, 101; 106/31.27, 31.6, 106/31.13
See application file for complete search history.

(56) References Cited

U.S. PATENT DOCUMENTS

| | | | |
|---|---|---|---|
| 5,143,904 | A | 9/1992 | Minato et al. |
| 5,610,637 | A | 3/1997 | Sekiya et al. |
| 5,615,872 | A | 4/1997 | Mochimaru |
| 5,657,060 | A | 8/1997 | Sekiya et al. |
| 5,670,995 | A | 9/1997 | Kupcho et al. |

(Continued)

FOREIGN PATENT DOCUMENTS

JP 54-051837 4/1979

(Continued)

OTHER PUBLICATIONS

U.S. Appl. No. 08/547,904 of Sekiya, filed Oct. 25, 1995.

(Continued)

*Primary Examiner* — Manish S Shah
(74) *Attorney, Agent, or Firm* — Cooper & Dunham LLP

(57) ABSTRACT

A containing member contains a recording medium which has a base member and granular material coated on both sides of the base member, and roughness of the surfaces of the coated granular material is smaller than the roughness of the base member. A printing unit includes an ink-jet recording head which jets recording liquid onto the recording medium. A conveyance unit and a conveyance path convey the recording medium, one side of which has been already printed, into the printing unit again in order to print image onto the other side thereof. A unit is provided for enabling the printing unit to print image on the recording medium such that the vertical orientations of the images printed both sides of the recording medium are coincide with each other.

7 Claims, 15 Drawing Sheets

U.S. PATENT DOCUMENTS

| | | | | |
|---|---|---|---|---|
| 5,729,257 | A | 3/1998 | Sekiya et al. | |
| 5,764,245 | A | 6/1998 | Yokoi | |
| 5,764,263 | A * | 6/1998 | Lin | 347/102 |
| 5,864,352 | A | 1/1999 | Aoki et al. | |
| 5,877,786 | A | 3/1999 | Sekiya et al. | |
| 5,897,961 | A | 4/1999 | Malhotra et al. | |
| 6,012,809 | A * | 1/2000 | Ikeda et al. | 347/101 |
| 6,039,425 | A | 3/2000 | Sekiya et al. | |
| 6,055,001 | A | 4/2000 | Sakaki et al. | |
| 6,144,814 | A | 11/2000 | Newell, Jr. et al. | |
| 6,193,348 | B1 | 2/2001 | Sekiya et al. | |
| 6,227,639 | B1 | 5/2001 | Sekiya et al. | |
| 6,250,754 | B1 | 6/2001 | Bortolotti | |
| 6,281,917 | B1 | 8/2001 | Katsuragi et al. | |
| 6,326,055 | B1 | 12/2001 | Arai et al. | |
| 6,338,545 | B1 | 1/2002 | Sekiya | |
| 6,487,382 | B2 | 11/2002 | Underwood et al. | |
| 6,502,934 | B2 | 1/2003 | Yamamoto et al. | |
| 6,508,169 | B1 | 1/2003 | Sato | |
| 6,533,477 | B2 | 3/2003 | Fukuda | |
| 6,554,401 | B2 | 4/2003 | Sekiya | |
| 6,568,778 | B1 | 5/2003 | Sekiya et al. | |
| 6,598,959 | B2 | 7/2003 | Sekiya | |
| 6,669,190 | B1 | 12/2003 | Wei | |
| 6,679,600 | B1 | 1/2004 | Regimbal | |
| 7,445,326 | B2 | 11/2008 | Sekiya | |
| 2002/0196322 | A1 | 12/2002 | Fujii et al. | |
| 2003/0007054 | A1 | 1/2003 | Namiki et al. | |
| 2003/0053501 | A1 | 3/2003 | Sekiya et al. | |
| 2004/0246325 | A1 | 12/2004 | Sekiya | |
| 2005/0052524 | A1 | 3/2005 | Isono et al. | |
| 2009/0027472 | A1 | 1/2009 | Sekiya | |

FOREIGN PATENT DOCUMENTS

| | | |
|---|---|---|
| JP | 02179749 | 7/1990 |
| JP | 05131696 | 5/1993 |
| JP | 5-330148 | 12/1993 |
| JP | 09267528 | 10/1997 |
| JP | 2000-158636 | 6/2000 |
| JP | 2000-211250 | 8/2000 |
| JP | 2000-256992 | 9/2000 |
| JP | 2001063019 | 3/2001 |
| JP | 2001080208 | 3/2001 |
| JP | 2001-254037 | 9/2001 |
| JP | 2001302002 | 10/2001 |
| JP | 2001353876 | 12/2001 |
| JP | 2002-179958 | 6/2002 |
| JP | 2002-283700 | 10/2002 |

OTHER PUBLICATIONS

U.S. Appl. No. 09/793,249 of Sekiya, filed Feb. 26, 2001.
U.S. Appl. No. 09/988,845 of Sekiya, filed Nov. 16, 2001.
U.S. Appl. No. 10/135,000 of Sekiya, filed Apr. 29, 2002.
U.S. Appl. No. 10/175,181 of Sekiya, filed Jun. 19, 2002.
U.S. Appl. No. 10/224,656 of Sekiya, filed Aug. 20, 2002.
U.S. Appl. No. 10/267,357 of Sekiya, filed Oct. 9, 2002.
U.S. Appl. No. 10/386,056, filed Mar. 12, 2003.
U.S. Appl. No. 10/388,700 of Sekiya et al., filed Mar. 14, 2003.
U.S. Appl. No. 10/394,547 of Shinotsuka et al., filed Mar. 21, 2003.

* cited by examiner

INK-JET RECORDING APPARATUS, INK-JET COPIER AND RECORDING MEDIUM

CROSS-REFERENCE TO RELATED APPLICATION

This application is a continuation of application Ser. No. 12/239,352, filed Sep. 26, 2008, now U.S. Pat. No. 7,673,980, which in turn is a continuation of application Ser. No. 10/690,296, filed Oct. 21, 2003, now U.S. Pat. No. 7,445,326, the entire contents of each of which are incorporated by reference herein.

BACKGROUND

1. Technical Field

This disclosure relates to an ink-jet recording apparatus which performs recording on both sides of a recording medium, and ink-jet copier employing the ink-jet recording apparatus and a recording medium used therein.

2. Description of the Related Art

A non impact recording method has taken attention recently in terms of the fact that a noise occurring at a time of recording is so small that it can be almost ignored. In this situation, a so-called ink-jet recording method is very advantageous recording medium in that a high-speed recording can be achieved, and, also, a so-called ordinary paper can be applied without necessity of any special fixing processing. Accordingly, various methods have been put into practical use after being developed and improved, while some methods are still on development so as to be put into practical use in future in the same technical field.

Such an ink-jet recording method performs recording by jetting a small drop (droplet) of a recording liquid called ink, and making it adhere to a recording medium. The ink-jet recording method may be classified into various methods with respect to a way of how to create a small drop of recording liquid or a way of controlling the direction in which the recording liquid is jetted.

For example, U.S. Pat. No. 3,060,429 discloses a Tele type, i.e., an electrostatic absorption method in which a recording liquid is absorbed electrostatically so as to create a small drop, the thus-created small drop is controlled by an electric field according to a recording signal, and, thus, is made to adhere to a recording medium selectively.

U.S. Pat. Nos. 3,596,275 and 3,298,030 discloses a Sweet type, i.e., a continuous flow type or a charge control type in which, by a continuous vibration generation method, recording liquid small drops controlled in charge amounts thereof are created, and then, the small drops controlled in charge amounts thereof are made to fly between deflection electrodes by which a uniform electric field is applied. Thereby, recording on a recording medium is achieved.

U.S. Pat. No. 3,416,153 discloses a Hertz method in which an electric field is applied between a jetting mouth and a ring-like charged electrode. Then, a continuous vibration generation method is applied so as to create a mist of recording liquid small drops, whereby recording is achieved. In this method, the electric field intensity between the jetting mouth and ring-like charged electrode is modified according to a recording signal, whereby the mist state of the small drops is controlled, and, thus, a tone variation in the recording image is created.

U.S. Pat. No. 3,747,120 discloses a Stemme method which is basically different from the above-described three methods in principle. That is, in these three methods, recording liquid small drops flying after being jetted from jetting mouths are controlled electrically, and the small drops carrying the recording signal are selectively made to adhere to a recording medium. In contrast thereto, according to the Stemme method, according to a recording signal, recording liquid small drops are jetted from jetting mouths so as to be made adhere to a recording medium. Thus, according to the Stemme method, an electric signal is applied to a piezo vibration device provided in a recording head having jetting mouths, the electric recording signal is converted into a mechanical vibration via the piezo device, and, then, according to the mechanical vibration, the small drops are jetted from the jetting mouths, which then adhere to the recording medium. Such a method is called 'drop-on-demand type recording method'.

Japanese patent publication No. 56-9429 of the applicant of the present application discloses such a drop-on-type recording method in which, according to a recording signal, recording liquid small drops are jetted from jetting mouths, and then, recording is achieved. In this method, the ink in a liquid chamber is heated, bubbles are created in the ink, and, thanks to the function of the bubbles, ink drops are jetted from the jetting mouths. Such a method is called a bubble-ink-jet-type recording method.

As described above, there are various types in the ink-jet recording method in terms of the principle thereof. However, in any type, a common simple principle is applied in that small drops (droplets) of recording liquid, so-called ink, are jetted, and are made to adhere to a recording medium. Thereby, recently, full-scale utilization/spread of this way has become remarkable, and as a result, this method may provide an image quality which may some case become equal to that of a conventional so-called silver halide photographic image. As a result, application of this method has been studied and developed for a use not only in a printer but also for other various uses. As a part of such a trend, recently, a study has been preceded with concerning this technology in terms of resource saving, application to a copier, and so forth. However, in such a technical field, the development is merely started now, and, thus, no decisive technology has been established yet.

SUMMARY

In an aspect of this disclosure, an ink-jet recording apparatus is configured so that a good quality of images formed on both sides of a recording medium when double side printing is performed in the ink-jet recording apparatus so as to achieve saving resources.

In a second aspect, an ink-jet recording apparatus is configured to make uniform image qualities on both sides when the double side printing is performed which achieves resource saving in the ink-jet recording apparatus.

In a third aspect, a new configuration of an ink-jet recording apparatus is provided which performs the double side recording.

In a fourth aspect, an ink-let recording apparatus is provided to further improve the image quality in the above-mentioned ink-jet recording apparatus.

In a fifth aspect, another configuration of an ink-jet recording apparatus is provided which also achieves high image quality in the above-mentioned ink-jet recording apparatus.

In a sixth aspect, another configuration of an ink-jet recording apparatus is provided which also achieves high image quality in the above-mentioned ink-jet recording apparatus.

In a seventh aspect, a specific configuration of an ink-jet recording apparatus is provided to achieve higher recording speed and higher image quality.

In an eighth aspect, another specific configuration of an ink-jet recording apparatus is provided to achieve higher-recording speed and higher image quality.

In a ninth aspect, another specific configuration of an ink-jet recording apparatus is provided to achieve higher recording speed and higher image quality.

In a tenth aspect, a configuration of an ink-jet recording apparatus is provided by which vertical orientations of images formed on both sides of a recording medium are made to coincide with one another.

In an eleventh aspect, another configuration of an ink-jet recording apparatus is provided by which vertical orientations of images formed on both sides of a recording medium are made to coincide with one another.

In a twelfth aspect, another configuration of an ink-jet recording apparatus is provided by which vertical orientations of images formed on both sides of a recording medium are made to coincide with one another.

In a thirteenth aspect, a new ink-jet copier utilizing the ink-jet recording principle is provided.

In a fourteenth aspect, a new ink-jet copier which performs double side recording is provided.

In a fifteenth aspect, a new ink-jet copier is provided which performs double side recording at high recording speed.

In a sixteenth aspect of this disclosure, another new ink-jet copier which performs double side recording.

In a seventeenth aspect, a new ink-jet copier according to the ink-jet printing principle is provided in which the ink can be dried instantaneously.

In an eighteenth aspect, a recording medium which is used in such a new ink-jet recording apparatus is provided so that high image quality is achievable therewith.

In a nineteenth aspect, a recording medium which is used in such a new ink-jet copier is provided so that high image quality is achievable therewith.

In a twentieth aspect, a recording medium which is used in such a new ink-jet recording apparatus or an ink-jet copier is provided so that not only high quality printing is achievable but also image qualities thus-formed on both sides of the recording medium are made uniform therebetween.

In an exemplary embodiment of this disclosure, first, an ink-jet recording apparatus comprises:

a containing member which contains a recording medium which has a base member and granular material coated on both sides of the base member, and roughness of the surfaces of the coated granular material is smaller than the roughness of the base member;

a printing unit comprising an ink-jet recording head which jets recording liquid onto the recording medium;

a conveyance unit and a conveyance path for conveying the recording medium, one side of which has been already printed, into the printing unit again in order to print image onto the other side thereof; and a unit which enables the printing unit to print image on the recording medium such that the vertical orientations of the images printed both sides of the recording medium are coincide with each other.

Thereby, saving resources such as paper can be achieved, and, also, the vertical orientations of the images formed on both sides of the paper are made coincide with each other. Further, high image quality is achievable.

Second, in the above-mentioned first ink-jet recording apparatus, both sides of the granular material is substantially symmetrically coated on the base member with respect to the center line of the base member.

Thereby not only resource saving thanks to double side recording, but also the image quality can be made uniform between both sides of images in the ink-jet copier which can perform double side printing.

Third, an ink-jet recording apparatus includes:

a first containing member containing a first recording medium;

a second containing member which contains a second recording medium, and the second recording medium having a base member and a granular material coated on both surfaces of the base member, and roughness of both surfaces of the coated granular material is smaller than the roughness of the base member, and both granular material is substantially symmetrically coated on the base member with respect to the center line of the base member;

a printing unit comprising an ink-jet recording head which jets recording liquid onto the first recording medium or the second recording medium;

a conveyance unit and a conveyance path for conveying the second recording medium, one side of which has been already printed, into the printing unit again in order to print image onto the other side thereof; and a unit which enables the printing unit to print image on the other side of the second recording medium such that the vertical orientations of the images printed both sides of the recording medium are coincide with each other, wherein:

the second containing member containing the second recording medium is distinguishable from the first containing member.

Thereby, not only paper resource saving can be achieved, but also the vertical orientations of the images formed on both sides can be made coincide. Further, the image quality can be improved, while the image quality can be made uniform between both sides of images in the ink-jet copier which can perform double side printing.

Fourth, in any one of the above-mentioned first through third ink-jet recording apparatuses, the recording medium is temporarily stopped in the conveyance path.

Thereby, until the recording surface is dried, printing onto the other side of paper and conveyance of the paper is waited for. Thus, it is possible to avoid a problem in which the image quality is degraded since the printing onto the other side is started before the recording surface is well dried. Accordingly, high image quality is achieved in the ink-jet copier which can perform double side printing.

Fifth, in any one of the above-mentioned first through fourth ink-jet recording apparatus, a heating unit is provided in the conveyance path.

Thereby, the recording surface is dried there, and after that, conveyance of the paper and printing onto the other side is started. Thereby, it is possible to avoid a problem in which the image quality is degraded as a result of the printing onto the other side being started before the recording surface is well dried. Accordingly, high image quality is achieved in the ink-jet copier which can perform double side printing.

Sixth, any one of the above-mentioned first through fifth ink-jet recording apparatuses may further include a containing member which temporarily contains the recording medium on the conveyance path.

Thereby, the recording surface is dried there, and after that, printing onto the other side with conveyance of the paper is started. Thereby, it is possible to avoid a problem in which the image quality is degraded as a result of the printing onto the other side being started before the recording surface is well dried. Accordingly, high image quality is achieved in the ink-jet copier which can perform double side printing.

Seventh, in any one of the above-mentioned ink-jet recording apparatus, the ink-jet recording head has a multi-nozzle-type ink-jet recording head which jets ink with a frequency substantially from 1 kHz through 40 kHz per nozzle on demand and configured so as to jets a plurality of colors of ink; and the recording medium is conveyed to a position that faces the nozzle surfaces of the multi-nozzle-type ink-jet recording head during recording.

Thereby, in addition to the above-mentioned uniformity between both sides of images and high image quality thereof, high-speed printing can be achieved in the ink-jet copier which can perform double side printing.

Eighth, in the above-mentioned seventh ink-jet recording apparatus, the nozzles of the ink-jet recording head are arranged longitudinally so as to cover a printing width of the recording medium on which the image is to be printed, and the nozzles have a cross-sectional area in a range between 10 $\mu m^2$ and 600 $\mu m^2$, and the ink-jet recording head has 1000 through 100000 nozzles in the nozzle arrangement density of 400 dpi through 3200 dpi.

Thereby, in addition to the above-mentioned uniformity between both sides of images and high image quality thereof, further high-speed printing can be achieved in the ink-jet copier which can perform double side printing.

Ninth, the above-mentioned eighth ink-jet recording apparatus may further include a recording medium heating unit having a heating range extending along the direction perpendicular to the recording medium conveyance direction so as to cover a range larger than the printing width of the recording medium.

Thereby, it is possible that the ink on the recorded surface of the recording medium can be dried rapidly. Accordingly, in addition to the above-mentioned uniformity between both sides of images and high image quality thereof, further high-speed printing can be achieved in the ink-jet copier which can perform double side printing.

Tenth, in any one of the above-mentioned first through third ink-jet recording apparatus:

the unit which enables the printing unit to print image on the recording medium such that the vertical orientations of the images formed on both sides of the recording medium are coincide with one each other comprises:

a rotation control mechanism which rotates the orientation of the recording medium by substantially 180 degrees.

Thereby, even with a simple configuration, it is possible to achieve coincidence of the vertical orientations of images formed on both sides of the recording medium (paper) in the ink-jet copier which can perform double side printing.

Eleventh, in any one of the above-mentioned first through third ink-jet recording apparatus:

the unit which enables the printing unit to print mage on the recording medium such that the vertical orientations of the images formed on both sides of the recording medium are coincide with each another has:

a memory for storing image data that is used for printing image on the back side of the recording medium, front side of which has been already printed; and the unit sends the image data to the ink-jet recording head in the reverse order so that the image data is printed on the back side of the recording medium from bottom to top direction.

Thereby, without needing a complicated structural conveyance scheme, it is possible to make vertical orientations of images formed on both sides of paper coincide with one another with an electrical control in the ink-jet copier which can perform double side printing.

Twelfth, in any one of the above-mentioned first through third ink-jet recording apparatus:

the unit, which enables the printing unit to print image on the recording medium such that the vertical orientations of the images formed both sides of the recording medium are coincide with each other, comprises:

a twisted path provided on the conveyance path, the shape of which is twisted so that the front and back sides of the recording medium, which passes through the twisted path, is turned upside down for substantially 180 degrees.

Thereby, without necessity of in particular changing the vertical orientation between the obverse and reverse sides of paper, it is possible to turn the paper during conveyance thereof naturally, and, thus, to achieve printing with coincidence of images formed on both sides of paper in vertical orientations with a simple configuration in the ink-jet copier which can perform double side printing.

Thirteenth, an ink-jet copier includes:

a scanner which reads an original image placed on an original table, so as to form image data therefrom in sequence;

a printing unit which jets ink onto a recording surface of a recording medium based on the image data provided from the scanner; and a recording medium conveyance unit disposed below the printing unit for conveying and ejecting the recording medium in a predetermined timing according to the recording operation, a containing member which contains a recording medium having a base member and granular material coated on both sides of the base member, and roughness of the coated granular material is smaller than the roughness of the base member; and a unit which enables the printing unit to print the images on the recording medium such that the vertical orientations of the images printed on both sides of the recording medium are coincide with each other, wherein:

the printing unit has a multi-nozzle-type ink-jet recording head which jets ink with a frequency from 1 kHz through 40 kHz per nozzle on demand, and the ink-jet recording head is arranged so as to jet a plurality of colors of ink; and the recording medium conveyance unit includes:

a first conveyance unit that conveys the recording medium into a position that faces the nozzle surfaces of the multi-nozzle-type ink-jet recording head; and a second conveyance unit and a conveyance path for conveying the recording medium, one side of which has been already printed, into the printing unit again in order to printing image onto the other side thereof.

Thereby, it is possible to achieve a color copier easily with a simple principle compared with a copier in an electrophotographic type. Furthermore, with achievement of double side printing, resource saving is achieved, and, also, it is possible to achieve high image quality in images on both sides of paper.

Fourteenth, in the above-mentioned thirteenth ink-jet copier, the unit which enables the printing unit to print image on the recording medium such that the vertical orientations of the images formed both sides of the recording medium are coincide with each other comprises:

a rotation control mechanism which rotates the orientation of the recording medium by substantially 180 degrees.

Thereby, it is possible to achieve coincidence of vertical orientations of images formed on both sides of paper in the ink-jet copier which can perform double side printing in the ink-jet copier which can perform double side printing.

Fifteenth, in the above-mentioned thirteenth or fourteenth ink-jet copier:

the nozzles of the ink-jet recording head are arranged longitudinally so as to cover a printing width of the recording medium, on which the image is to be printed, and the nozzles have a cross-sectional area in a range between 10 $\mu m^2$ and 600 $\mu m^2$, and the ink-jet recording head has 1000 through 100000 nozzles in the nozzle arrangement density of 400 dpi through 3200 dpi.

Accordingly, in addition to uniformity between both sides of images and high image quality thereof, high-speed printing can be achieved in the color copier which can perform double side printing.

Sixteenth, any one of the above-mentioned thirteenth through fifteenth ink-jet copiers may further include:

a plurality of recording media; and a plurality of containing members containing the plurality of recording media, wherein:

at least one of the plurality of recording media comprises a recording medium, both sides of the granular material is substantially symmetrically coated on the base member with respect to the center line of the base member; and the containing member, which contains the recording medium, is distinguishable from the other containing members.

Thereby, it is possible to properly supply recording media for single side printing and recording media for double side printing without error in the new ink-jet recording apparatus or copier applying the ink-jet principle which can perform double side printing.

Seventeenth, any one of the above-mentioned thirteenth through sixteenth ink-jet copiers may further include a recording medium heating unit that has a heating range extending along the direction perpendicular to the recording medium conveyance direction so as to cover a range larger than a printing width of the recording medium, on which the image is to be printed.

Thereby, the ink can be dried instantaneously, and thus, in addition to the above-mentioned uniformity between both sides of images and high image quality thereof, high-speed printing can be achieved in the new ink-jet recording apparatus or copier applying the ink-jet principle which can perform double side printing.

Eighteenth, a recording medium used in an ink-jet recording apparatus, which has a containing member which contains the recording medium; a conveyance path for conveying the recording medium; one side of which has been already printed, into a printing unit again in order to printing image onto the other side thereof; and a unit for printing image on the recording medium such that the vertical orientations of the images printed both sides of the recording medium are coincide with each other, includes:

a base member;

and granular material coated inside of the base member and also both sides of the base member, and roughness of the surfaces of the coated granular material is smaller than the roughness of the base member.

Accordingly, it is possible to achieve a recording medium with which high image quality printing is achievable with the above-mentioned new ink-jet recording apparatus.

Nineteenth, a recording medium used in an ink-jet copier that has: a scanner unit which reads an original image placed on an original table, so as to form image data therefrom in sequence; a recording unit having a multi-nozzle-type ink-jet recording head which jets ink with a frequency of 1 kHz through 40 kHz per nozzle on demand, the ink-jet recording head is arranged so as to jet a plurality of colors of ink, the recording unit jetting ink onto a recording surface of the recording medium based on the image data provided from the scanner unit; a recording medium conveyance unit disposed below the printing unit for conveying and ejecting the recording medium in a predetermined timing according to the recording operation, the recording medium conveyance unit has a conveyance unit and conveyance path that convey the recording medium into a position that faces the nozzle surfaces of the multi-nozzle-type ink-jet recording head and convey the recording medium, one side of which has been already printed, into the printing unit again in order to print image onto the other side thereof; and a unit which enables to print image on the recording medium such that the vertical orientations of the images printed on both sides of the recording medium are coincide with each other, includes:

a base member; and granular material coated inside the base member and also both sides of the base member, and the roughness of the surfaces of the coated granular material is smaller than the roughness of the base member.

Accordingly, it is possible to achieve a recording medium with which high image quality printing is achievable with the above-mentioned new ink-jet recording apparatus.

Twentieth, in the eighteenth or nineteenth recording medium, both sides of the granular material is substantially symmetrically coated on the base member with respect to the center line of the base member.

Thereby, it is possible to achieve a recording medium with which high image quality printing and uniformity in image quality on both sides of recording medium is achievable with the above-mentioned new ink-jet recording apparatus or copier which can perform double side printing.

DETAILED DESCRIPTION OF THE PREFERRED EMBODIMENT

Figure 1:
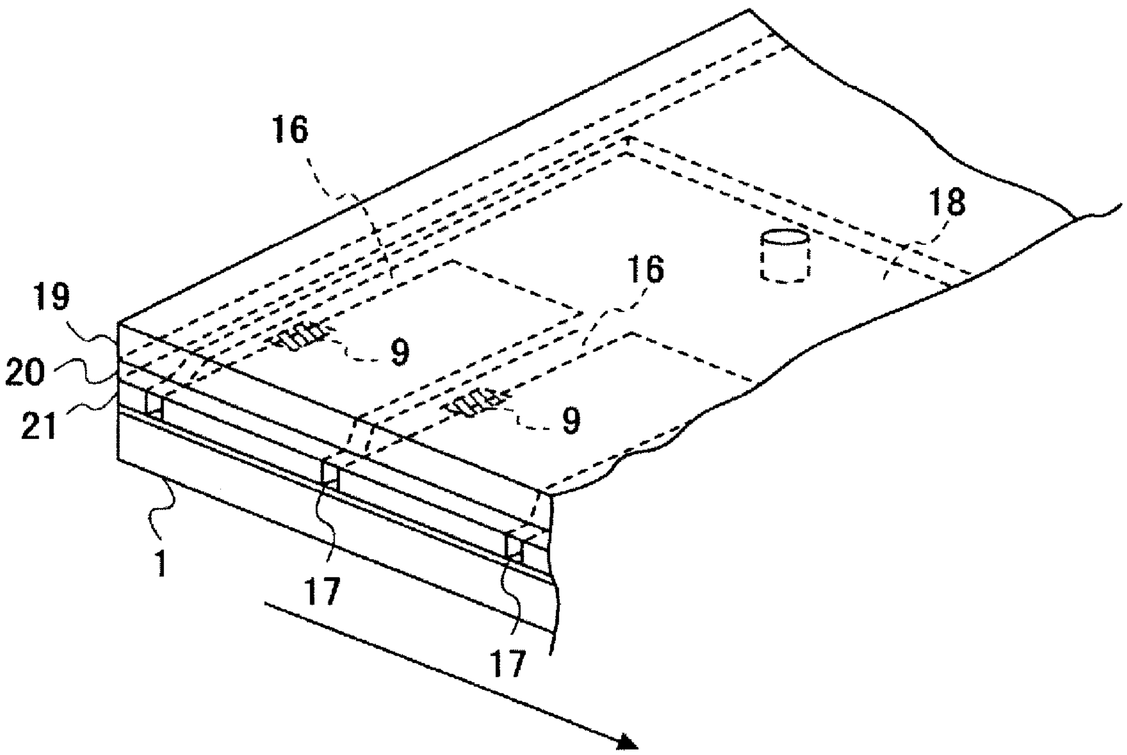
FIG. 1 is a partial perspective view of an ink-jet head applied to an embodiment of the present invention.

FIG. 1 is a partial perspective view illustrating an example of a multi-nozzle type ink-jet recording head which may be used in an ink-jet record apparatus according to the present invention. A structure of the ink-jet recording head shown is of a thermal ink-jet head in which a nozzle arrangement can be easily achieved at a high density such as 400 dpi through 3200 dpi. However, such a structure is merely an example, and it is not necessary to be limited thereto. As shown in FIG. 1, the multi-nozzle ink-jet recording head includes a heating element substrate 1, flow paths 16, nozzles (jetting mouths) 17, a common liquid chamber 18, a ceiling plate 19, a bonding layer 20, and a flow-path barrier 21. Although the figure shows a configuration for three nozzles, the multi-nozzle ink-jet recording head actually has a long width so as to cover a printing range on a sheet-like recording medium as will be described later, and has the number of nozzles in a range between several thousands through several hundreds of thousands arranged along the arrow shown (along the direction of the printing range of the recording medium).

Figure 2A:
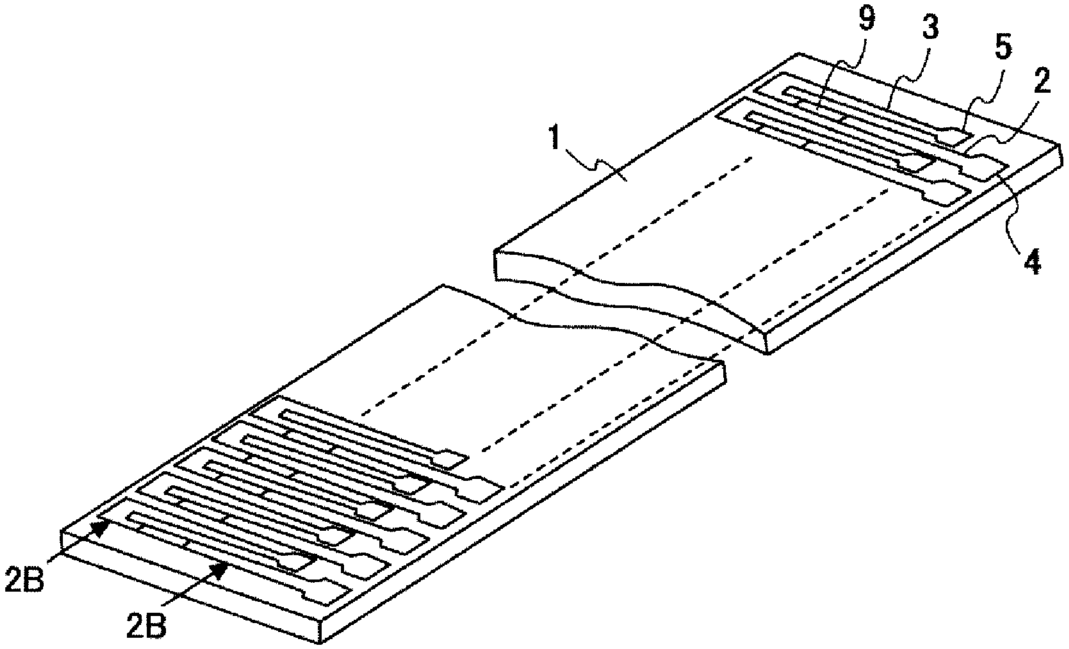
FIGS. 2A and 2B illustrate a heating element substrate of a thermal ink-jet head applied in the embodiment of the present invention.
Figure 2B:
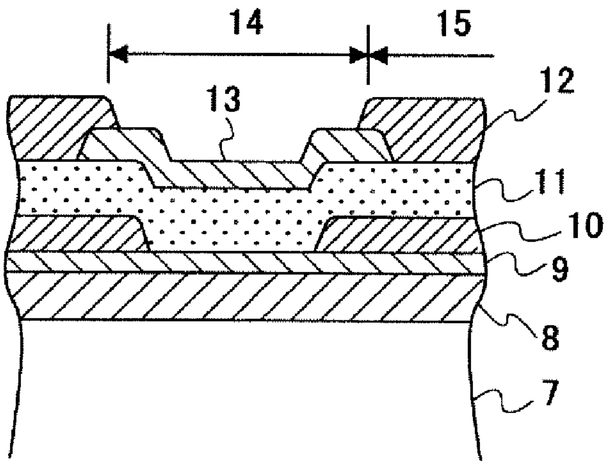

FIGS. 2A and 2B show a heating element substrate used in such a thermal ink-jet recording head, FIG. 2A shows a perspective view while FIG. 2B shows a sectional view taken according to arrows 2B-2B of FIG. 2A around the heating element. As shown in the figures, the heating element substrate 1 includes first electrodes (control electrodes) 2, second electrodes (common electrodes) 3, bonding pads 4, 5, a substrate 7, a thermal accumulation layer ($SiO_2$) 8, a heating element ($HfB_2$) 9, an electrode (Al) 10, a protection layer ($SiO_2$) 11, an electrode protection layer (Resin) 12, another protection layer 13, a heating element 14, and an electrode 15. For the purpose of simplification, FIG. 2B only shows a portion concerning the heating element and electrode which are essential parts of the heating element substrate.

The heating element substrate 1 has a configuration, as shown in FIG. 2B, in which, on the substrate 7 made of ceramics, such as alumina, glass, or silicon, the thermal accumulation layer ($SiO_2$) 8, heating element ($HfB_2$) 9, electrode 10, protection layer ($SiO_2$) 11, electrode protection layer 12, and other protection layer 13 are formed in the stated order by a film formation technology such as sputtering, pattern formation technology such as a photo-etching, and, then, the heating element 14 and electrode part 15 are formed on the surface.

Each heating element 9 is, as shown in FIG. 2A, connected with the first electrode (control electrode) 2 and second electrode (ground electrode) 3. Each first electrode 2 has the bonding pad 4 while each second electrode 3 has the bonding pad 5 at the ends thereof, respectively. These pads are connected with an image information input unit (not shown in the figure), and thereby, each heating element 9 is driven thereby independently. It is also possible that the second electrode 3 is provided as a common electrode for a plurality of heating elements 9, i.e., for a plurality of first electrodes 2. Moreover, it is also possible to provide a configuration such that each heating element is not driven independently, but is driven in a matrix manner. A row of such heating elements 9 may have a density of, for example, 400 dpi through 3200 dpi, and, thus, depending on an actual printing width on a recording medium, thousands through hundreds of thousands thereof are provided in total.

The thermal accumulation layer 8 is formed on the substrate 7. This thermal accumulation layer 8 is provided so as to avoid heat generated by the heating element 9 from escaping toward the substrate 7. That is, it is provided for the heat generated to finally generate air bubbles stably as a result of this heat being transmitted into ink efficiently. Usually, as the thermal accumulation layer 8, $SiO_2$ is used, and, specifically, for this layer 8, $SiO_2$ is used for forming a film having a thickness in a range between 1 micrometer through 5 micrometers using film formation technology, such as sputtering.

As shown in FIG. 2B, the layer of heating element 9 is formed on the thermal accumulation layer ($SiO_2$) 8, and, as the material of the heating element 9, a mixture of tantalum and $SiO_2$, tantalum nitride, nichrome, silver-and-palladium alloy, silicone semiconductor, or a boride of metal such as hafnium, lantern, zirconium, titanium, tantalum, tungsten, molybdenum, niobium, chromium, vanadium, or the like may be employed.

Hafnium boride ($HfB_2$) is most excellent among the metal boride, and, subsequently zirconium boride, lanthanum boride, tantalum boride, vanadium boride, and niobium boride are superior in the stated order.

The heating element 9 can be formed by a technique, such as electron-beam deposition, sputtering, or the like, using the above-mentioned material. The thickness of the heating element 9 is determined depending on the area, material, shape, size of heating functioning portion thereof, and also, it is determined further according to the requirement on the power consumption saving. In an ordinary case, it is in a range between 0.001 micrometers and 5 micrometers, more preferably, a range between 0.01 micrometers and 1 micrometer.

According to each specific embodiment of the present invention, the heating element 9 is formed through sputtering of $HfB_2$ into the thickness of 2000 Å (0.2 micrometers).

As a material of the electrode 10, many matters as electrode materials ordinarily used for such an electrode in the prior art may be used effectively, and, specifically, Al, Ag, Au, Pt, Cu, or the like may be used. By using it, at a predetermined position in a predetermined size, shape, and thickness, depending on a particular technique, such as vacuum evaporation, the electrode 10 is formed. According to each specific embodiment of the present invention, 1.4 micrometers of aluminum film is formed by sputtering.

The characteristic required on the protection layer 11 is not only anti-corrosion property against the ink and protection against mechanical impact caused by disappearance of air bubbles (cavitation-proof nature) but also transmitting effectively the heat generated by the heating element 9 into heat sensing paper, ink ribbon, or into the ink acting as the recording liquid.

For example, silicon oxide, silicon nitride, magnesium oxide, aluminum oxide, tantalum oxide, zirconium oxide, or the like may be used as the material of the protection layer 11, and it may be formed by using a technique, such as electron-beam deposition, sputtering or the like. Moreover, a ceramic material, such as silicon carbide, aluminum oxide (alumina), may also be preferably used.

The film thickness of the protection layer 11 should be made to fall within a range between 0.01 micrometers and 10 micrometers, preferably, within a range between 0.1 micrometers and 5 micrometers, and, most preferably, within a range between 0.1 micrometers through 3 micrometers. According to each specific embodiment of the present invention, 1.2 micrometers of $SiO_2$ film is formed by sputtering.

Further, as shown in FIG. 2B, 2 micrometers of resin layer is formed as the electrode protection layer 12. This layer is not necessarily required and may be omitted. In consideration of cavitation-proof nature, as for the material of the protection layer 13, tantalum (Ta) may be preferably used. In the heating element part 14, since the cavitation impact power by bubble generation is applied, for the purpose of protection from destruction, a good performance should be obtained by forming 4000 Å (0.4 micrometers) formation of Ta film by sputtering as the protection layer 13.

Thus, the ink-jet recording head is configured by using the heating element substrate 1.

FIGS. 3A through 3F illustrate a manufacturing process of the thermal ink-jet head in the embodiment of the present invention. Same as in FIG. 1, the ceiling plate 19, bonding layer 20 and flow path barrier 21 are formed, and, also, a photoresist 22 and a photo-mask 23 are utilized.

Figure 3A:
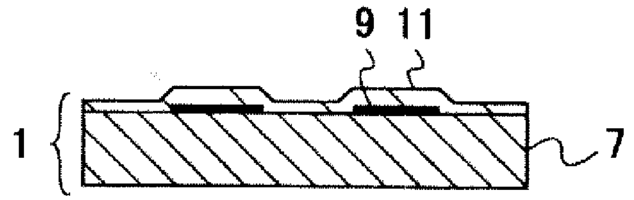
FIGS. 3A through 3F illustrate a manufacture process of the thermal ink-jet head applied in the embodiment according to the present invention.

First, as shown in FIG. 3A, the heating element substrate is prepared as follows: On the substrate 6, the heating element 9 and the thin film 11 for protecting and insulating the heating element 9 are formed.

Figure 3B:
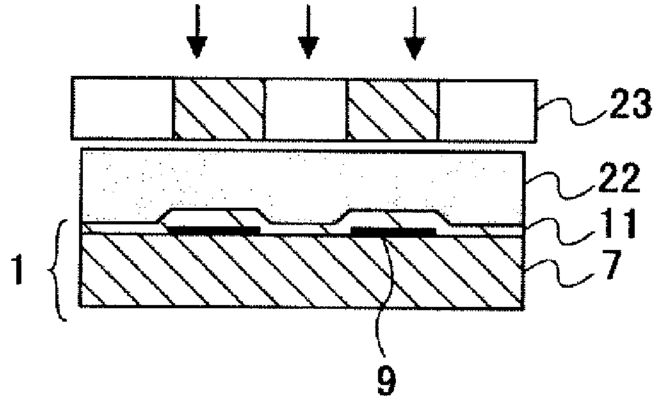

Then, as shown in FIG. 3B, the photoresist is coated on the heating element substrate 1, as follows: On the heating element substrate 1 shown in FIG. 3A, for example, the photoresist 22 on approximately 3 through 30 micrometers in film thickness is formed of a material having the viscosity in a range between 1000 and 2000 cP (centipoises) by spin coating, dip coating, or roller coating. Finally this thickness becomes the height of the flow path barrier 21, and this thickness depends on the arrangement density (printing density) of the heating elements 9. In case the layer of photoresist 22 having the thickness more than 20 micrometers, not a liquefied photoresist but a dry-film-type photoresist should be used.

Then, on the photoresist 22 provided on the surface of the heating element substrate 1 as shown in FIG. 3B, the photomask 23 having a predetermined pattern is put. After that, exposure is performed from the top of this photomask 23. It is necessary to perform proper positioning between the heating element 9 and the above-mentioned pattern at this time.

Figure 3C:
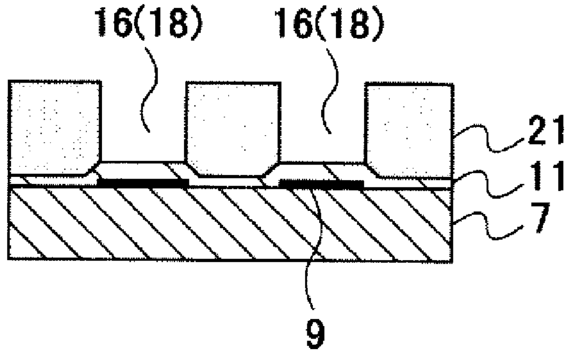

Then, as shown in FIG. 3C, the flow path barrier 21 is formed. Specifically, by using an alkaline developing solution, such as sodium carbonate solution, the non-exposed parts of the photoresist 22 are removed, and then, the flow path barriers 21 are formed. The thus-removed portions form recess parts which have the heating elements 9, respectively, and also form the flow paths 16 and the common liquid chamber 18.

Figure 3D:
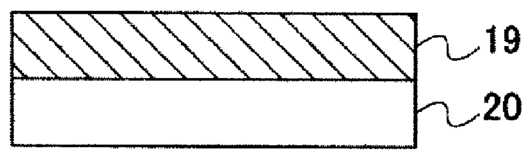

Then, as shown in FIG. 3D, a substrate serving as a ceiling of the flow path 16 and common liquid chamber 18 is produced. The substrate serving as the ceiling of flow path 16 and common liquid chamber 18 is produced by bonding of the bonding layer 20 and glass substrate 19, and the glass substrate 19 serves as the ceiling plate.

Figure 3E:
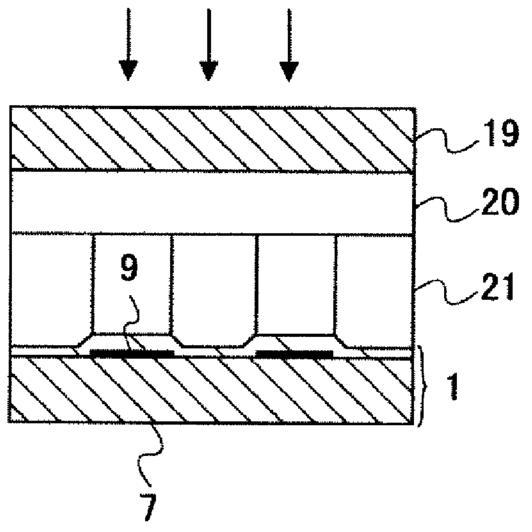

Then, as shown in FIG. 3E, the thus-produced substrate is bonded onto the flow path barrier 21. Specifically, bonding is made such that the photoresist 22 (flow path barrier 21) and bonding layer 20 are made to face one another, between the glass substrate 19 becoming the ceiling plate and the heating element substrate 1. At this time, thermal setting processing (for example, heating for 30 through 60 minutes, at 150 through 250° C.), or ultraviolet irradiation (for example, at ultraviolet intensity equal to or more than 50 $mW/cm^2$ through 200 $mW/cm^2$) is performed so as to improve the bonding strength.

Figure 3F:
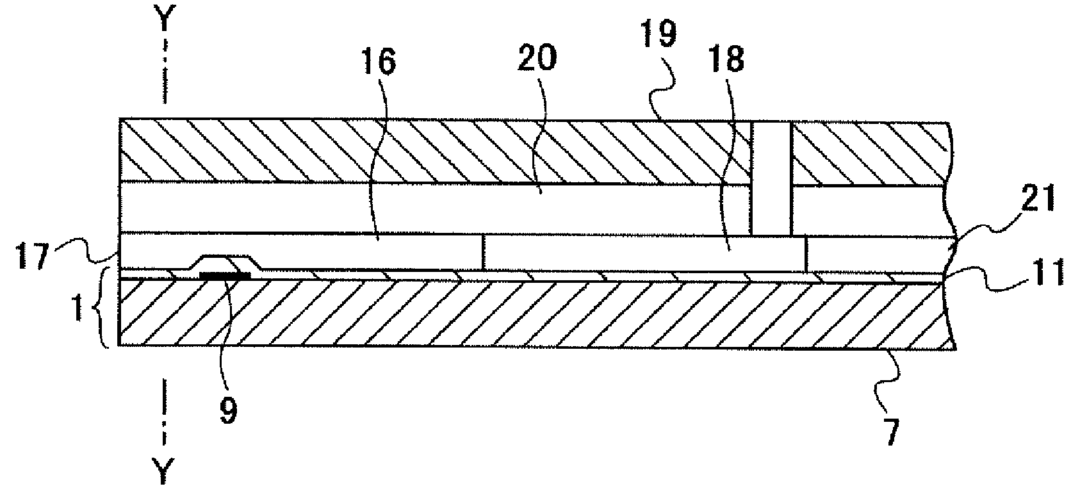
Figure 4A:
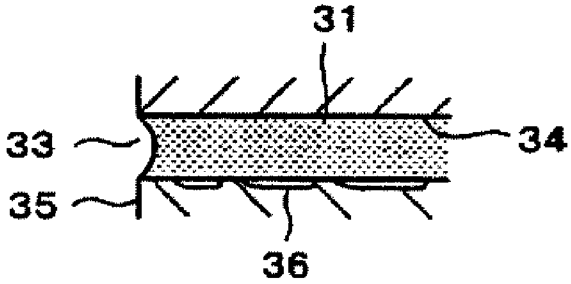
FIGS. 4A through 4G illustrate the thermal ink-jet head applied in the embodiment according to the present invention of operation.
Figure 4B:
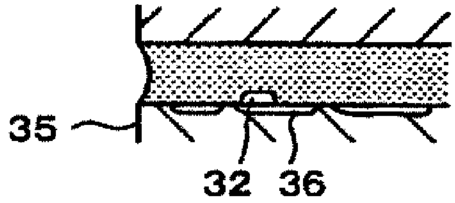
Figure 4C:
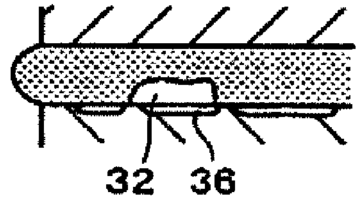
Figure 4D:
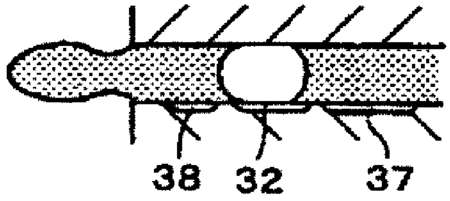
Figure 4E:
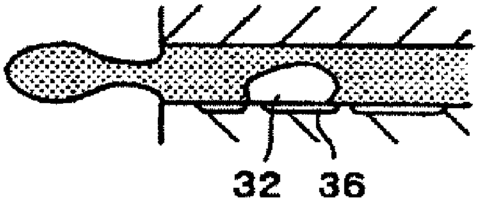
Figure 4F:
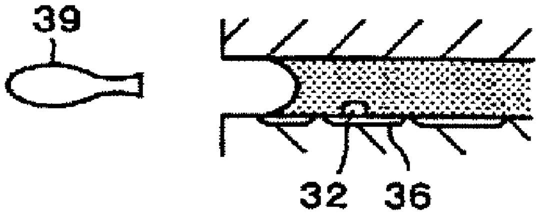
Figure 4G:
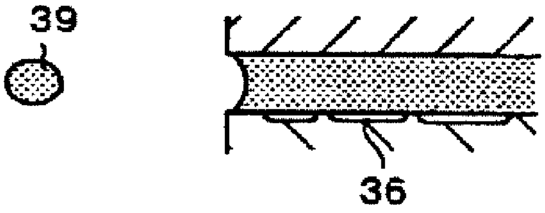

Then, as shown in FIG. 3F, jetting nozzles 17 are formed. Specifically, through dicing, the portion of Y-Y line near the openings on the side of the heating elements is cut. Thereby, the jetting nozzles 17 are formed, and, thus, the ink-jet recording head is produced. In this case, the nozzle size falls within a range between 3 micrometers×3 micrometers and 30 micrometers×30 micrometers, according to the resist thickness.

As another method for manufacturing the nozzles, there is a method of manufacturing the flow paths and common liquid chamber through integral mold by using a resin such as polysulfone, polyethersulfone, polyphenyleneoxide, polypropylene, polyimide or the like.

Alternatively, a resin film may be put on the flow path end, jetting nozzles are formed by perforating it by means of an excimer laser, or the like. Since the jetting nozzle formation method by means of the excimer laser elables formation of the nozzles in arbitrary shapes, i.e., a round shape, a polygonal shape, a star shape or the like, by means of a mask shape, this method is superior as the shape of nozzle can be freely determined according to ink jetting characteristics. Also in this method, resin, such as polysulfone, polyethersulfone, polyphenyleneoxide, polypropylene, polyimide or the like may be preferably used for the above-mentioned resin film. According to the embodiment of the present invention, the more preferable nozzle size falls within a range between 3 micrometers×3 micrometers and 25 micrometers×25 micrometers. In this example, the cross-section of the nozzle has a shape of a square, and the cross-sectional area falls within a range between approximately 10 $\mu m^2$ and 600 $\mu m^2$. In case of another nozzle cross-sectional shape is applied, the specific dimensions may be calculated from this data of the cross-sectional area.

This is determined in consideration of the finally required printing density. However, as another important factor is a problem of drying of the ink. This is because, if too large nozzle is provided, for example, larger than 30 μm×30 μm (i.e., in terms of cross-sectional area, larger than approximately 1000 $\mu m^2$), the ink drop created therefrom becomes large. In such a case, when printing is performed with nozzles arranged to extend along an entire width of a paper sheet for the entire width of printing range, a very long time may be needed for the ink thus made to adhered to the paper to be dried sufficiently. Similar problem may occur even in a case where, not with the nozzle arranged along the entire width of the paper but applying a serial scanning manner, the number of nozzles falls within a range between 500 and 1000, or more, and therewith, printing for the entire width of the paper is performed. Accordingly, the preferable nozzle size falls within a range between 3 micrometers×3 micrometers and 25 micrometers×25 micrometers.

In terms of drying of ink, the volume of ink drop is calculated by raising to the third power of the size in each dimension of the nozzle (assuming that the square nozzle is applied). Thus, in case the size of each dimension is smaller than 25 micrometers as mentioned above (less than approximately 600 $\mu m^2$ in cross-sectional area), the volume of each ink drop can be effectively reduced, and, thus, the time required for sufficiently drying the ink can be effectively reduced.

Especially, in case of performing double side printing directed to in the present invention, the necessity of reducing the required time for ink drying and ink penetration into the paper becomes very large compared with a case of single side printing. Thus, in order to achieve easiness of paper conveyance (to avoid printed image degradation otherwise caused by occurrence of conveyance of paper before the ink has been sufficiently dried), and to improve the throughput (the number of paper sheets of printed matters which can be produced within a unit time interval), the nozzle size should fall within a range between 3 micrometers×3 micrometers and 25 micrometers×25 micrometers (less than approximately 600 $\mu m^2$ in the cross-sectional area), thereby accelerating the ink drying.

As to the lower limit of the nozzle size, in order to ensure a stable jetting of minute ink drops, the nozzle size should be more than 3 micrometers×3 micrometers (more than approximately 10 $\mu m^2$ in the cross-sectional area). This is because, if the size becomes smaller than this, the ink jetted therewith becomes rather mist than drops, and, the ink mist may float in the air. If so, it becomes difficult to apply the ink onto a desired position at paper which is a recording medium.

Next, with reference to FIGS. 4A through 4G, the principle of the ink jetting by such an ink-jet recording head will be described briefly.

As shown in the figures, to each heating element 36, a signal pulse is input through the first electrode 37 and second electrode 38, and an air bubble 32 is generated in the ink according to this input pulse. Thereby, the ink in the flow path 34 is jetted as an ink drop 39 from the jetting nozzle 33 thanks to the pressure applied by the thus-generated air bubble, and it is used for recording on a recording medium (for example, paper).

The continuation time of this signal pulse (ON period) is preferably several microseconds through ten and several microseconds, and, should not be longer than 30 microseconds. Since the air bubble 32 blocks the heat of the heating element 36 after once the air bubble 32 is generated on the heating element 36, the size of the air bubble 32 hardly changes. Accordingly, it should be useless to elongate the continuation time on the signal pulse so as to supply the electric current to the heating element 36. Rather, the longer continuation time may shorten the lifetime of the heating element 36.

After the energization of the heating element 36 is terminated, the heat of the air bubble 32 is removed by the heating element substrate 35 and the peripheral ink, and thus, the air bubble 32 becomes smaller and then disappears.

As can be seen from the above description, the air bubble is obtained by heating rapidly very much according to the ink jetting principle according to the present invention. Such a type of air bubble is one generated due to so-called 'film boil' in the field of heat conduction industry, and, is superior in reproducibility for repetitive alternate actions of occurrence and disappearance thereof.

Furthermore, it is also possible to configure so that the position of the heating element 36 is made to approach the jetting nozzle 33 so as to enable jetting of a minute ink drop, the air bubble generated is caused to project externally of the jetting nozzle 33, or to explode there.

Moreover, although the above-mentioned description is made also for the manufacturing method assuming the thermal ink-jet-type head, the above description according to the present invention may also be applied to an ink-jet head employing piezo-electric elements, or the like.

As another ink jet system, there is a charge control method (also called continuous flow method). However, this system has a complicated configuration, and, thus, in an embodiment of the present invention, rather then this, the above-mentioned thermal ink-jet system or an on-demand type (a type in which ink is jetted as the necessary arises) ink-jet system applying the piezo element or so may be preferably used.

Furthermore, according to the embodiment of the present invention, the multi-nozzle type is applied as mentioned above for the purpose of covering the required printing range, the driving frequency (ink drop jetting frequency) of the recording head falls within a range between several kilohertz and forty kilohertz per nozzle, and the driving is performed in an on-demand manner. On the other hand, in case where the above-mentioned charge control method is applied, this method has a performance of creating ink drops at a frequency of 100 kilohertz through 1 megahertz (a hundred of thousands through a million ink drops are created per second). However, in the embodiment of the present invention, as the multi-nozzle type is applied as mentioned above, such a very high ink drop generating performance is not needed. Rather, a performance within a range between several kilohertz and forty kilohertz per nozzle is sufficient actually.

Figure 5:
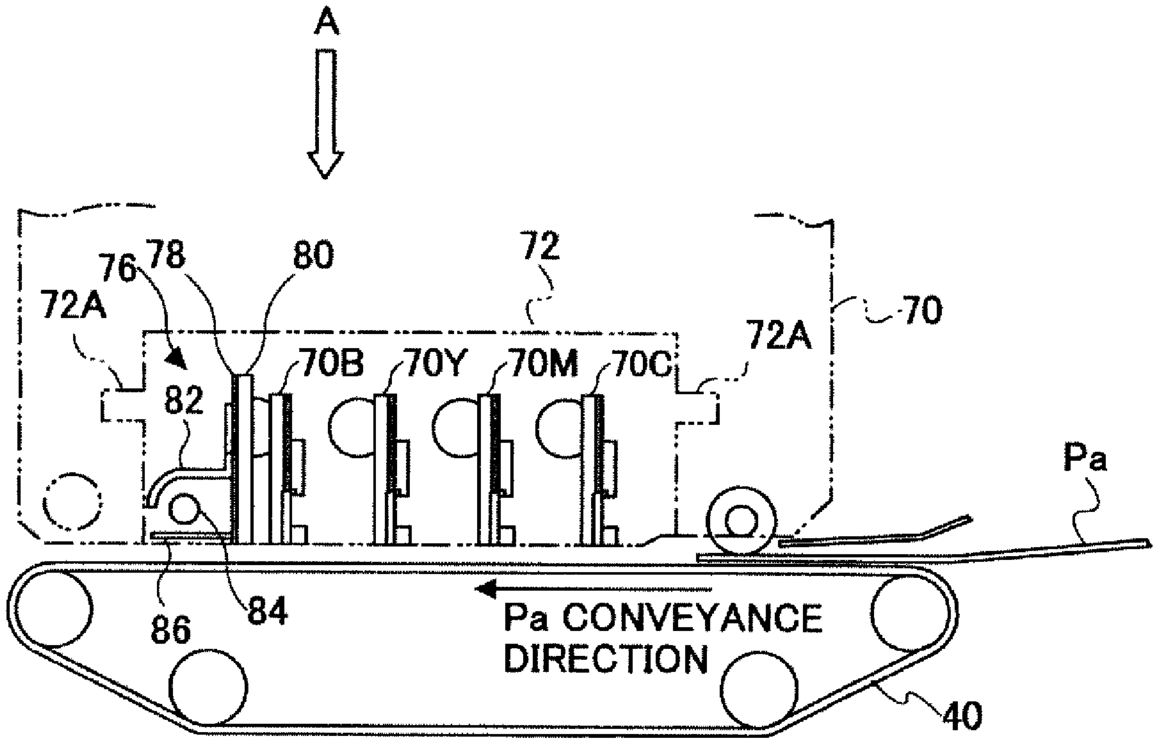
FIG. 5 shows a recording part containing a heating fixing device according to the present invention.

FIG. 5 shows a recording part 70 in a multi-nozzle type ink-jet recording device having a long dimension so that a plurality of ink jetting nozzles cover the printing range of a predetermined recording medium, i.e., paper.

The recording part 70 has a head block 72 having respective recording heads 70C, 70M, 70Y, and 70B on cyan, magenta, yellow, and black, respectively, and a heating-type fixing device 76 which will be described later. The head block 72 is supported inside of the recording part 70 through projection parts 72A provided at the both ends thereof along a conveyance path of the recording medium (paper Pa).

The respective recording heads 70C, 70M, 70Y, and 70B are disposed with predetermined mutual intervals from the upstream end through the downstream end of the conveyance path of the paper Pa in sequence. In this case, the recording heads 70C through 70B are positioned in the head block 72 in a manner such that the flatness on a plane formed by all the jetting surfaces (nozzle surfaces) of those heads may fall within tens of micrometers.

The respective recording heads 70C, 70M, 70Y, and 70B are of the above-mentioned thermal ink-jet type, for example, and jet the inks of cyan, magenta, yellow, and black, respectively. That is, the respective recording heads 70C through 70B jet ink drops formed through heating by heaters (as mentioned above with reference to FIGS. 1 through 4G) as thermoelectric transformation devices provided in liquid flow paths which communicate with the jetting nozzles.

The respective recording heads 70C through 70B have the plurality of jetting nozzles arranged along a direction approximately perpendicular to the conveyance direction of the paper Pa. The plurality of jetting nozzles are provided throughout the width of the recording surface of the paper Pa in the direction approximately perpendicular to the conveyance direction of the paper Pa.

Recording operations by the respective recording heads 70C, 70M, 70Y, and 70B are performed on the same paper Pa, respectively, and the recording head 70C records first for example, the recording head 70M records second at the same position in an overlapping manner or at another position, the recording head 70Y records third similarly, and, finally the recording head 70B records, in sequence.

The recording heads 70C through 70B may not necessarily be those which jet the ink but at least one thereof may jet a treatment liquid which insolubilizes the ink, or jets a treatment liquid onto the paper Pa before the ink jetting for avoiding each pixel of the ink formed on the paper Pa from spreading or running much on the paper Pa.

It is noted that the actual order of printing with the respective colors is not limited thereto.

In such a type of ink-jet recording scheme, as ink adheres to a recording material and permeates into this material, the ink is fixed there. Alternatively, adhering ink is fixed through an ink solvent evaporation process.

However, a time required for fixing the ink since it adheres to the recording medium, i.e., a fixing speed, depends not only on a configuration/physical properties of the recording material greatly, but is greatly influenced by the state of external atmosphere. Moreover, the naturally fixing speed cannot be shortened shorter than a predetermined time determined according to the physical properties.

As mentioned above, the speed at which the ink adheres to and permeates into the recording material is influenced by the composition of the ink.

Usually, in many cases, the composition of the ink is distinguished by permeability into a recording material/medium. Generally, ink having high permeability is advantageous, in terms of fixing nature since the ink with high permeability has a high fixing speed onto recording material. However, when the permeability is too high, this means that the ink may spread too wide on the recording medium so as to degrade the image formed thereon in some case. Moreover, when the ink permeates deeply into the recording material, the image tone may become lowered on the recording medium.

On the other hand, as mentioned above, when ink having low permeability is used, a time required for fixing thereof on a recording material is longer, and, thus, the following problems may occur in a device having a multi-nozzle type ink-jet recording head having a long dimension so as to cover the printing range of the recording medium and directed to high-speed printing. That is, in case of multi-color printing, different colors may be problematically mixed on the recording medium, blots of the ink may occur, or scratch of the printed image may occur when the printed matter is ejected from the device. Therefore, a configuration of the device is required in which the fixing performance, image density, blot, scratch-proof capability should be considered well.

Furthermore, as will be described later, paper to be used for printing should be coated paper in which predetermined matter is coated on the surface with which no ink blotting/blurring may occur thereon and the ink is instantaneously absorbed thereinto. For example, it is preferable to apply coated paper in which granular material such as pulverized silic acid or so is coated thereto.

In a conventional serial scanning recording device, the necessary ink fixing performance can be achieved merely by a simple configuration as the recording speed required is not so high. However, in order to fix ink in a desired state in which the ink is jetted onto a recording material as mentioned above in case high-speed recording as in the embodiment of the present invention is required, and, especially, color recording/printing is performed, a heating-type ink fixing device 76 which will be described below is preferably used for shortening the required ink fixing time and for increasing the printing efficiency.

The heating-type ink fixing device 76 is provided on the downstream side of and relatively close to the recording head 70B along the conveyance path, as shown in FIG. 5. In this embodiment, a halogen heater 84 and a reflective plate 82 made to reflect heat radiation of the halogen heater 84 act as the heating-type ink fixing device 76, for example.

Thus, according to the embodiment of the present invention, non-contacting heating of the printing surface of a recording medium (paper Pa) is achieved. That is, since the heating is made from the top of the surface of the printed zone, volatile substance in the ink, such as water, can be dried out efficiently.

As the heating-type ink fixing device 76, there are provided the halogen heater 84 as the heating part, the reflective plate 82 reflecting the heat radiation from the halogen heater 84, a heating part separating member 86 separating the halogen heater 84 from the conveyance path, a heat insulating device 78 thermally isolating the recording head 70B from the halogen heater 84 so as to avoid the heat of the heater 84 from reaching the recording head 70B.

Specifically, in the embodiment, the halogen heater 84 is provided near the downstream end in the conveyance direction of the paper Pa in the recording part 70, adjacent to the recording head 70B. This is because it is necessary to carry out the thermal fixing with the halogen heater 84 immediately after the image recording by the recording heads 70C through 70B. This halogen heater 84 performs non-contacting heating of the recording surface of the recording medium. By this, the recorded surface is dried, drying of the ink is promoted, and thus, the ink fixing speed is improved remarkably. Furthermore, there is another advantage that it can dry with heating in a non-contacting state, it is possible to prevent the dot shapes formed by the ink on the recorded surface of the paper Pa from being deformed and thus, to avoid degradation of the printed image.

The heating operation is controlled in predetermined timing according to the conveyance of the paper Pa and the recording operation in the recording part 70 by a control unit concerning the halogen heater 84 which will be described later.

Moreover, the halogen heater 84 has a thermostat (not shown) which controls the temperature of the halogen heater 84. The ink fixing temperature is controlled appropriately according to conditions, such as the quality of paper as the recording material, the conveyance speed, required image density/tone, and so forth by means of the thermostat.

As the heating unit for heating a surface (recorded surface) of the paper Pa to which the ink adheres, not only the halogen heater but also a halogen lamp, a sheathed heater, a ceramic heater, a thermistor, or the like, for example, may also be used.

The heating part separating member 86 is made of metal wires and provided in a position such as to cover the bottom part of the halogen heater 84 so as to prevent the paper Pa from accidentally contacting the halogen heater 84 even in a case of occurrence of paper jamming or the like.

The reflective plate 82 having an end thereof connected with the heat insulation device 80 is made for example, from an aluminum bright alloy, or the like, and it has a curve part which covers the top of the halogen heater 84 as shown in FIG. 5. The reflective plate 82 is configured to reflect the heat radiation from the halogen heater 84 on the inside of the curve part thereof so as to efficiently cause the reflected heat radiation to reach the recorded surface of the paper Pa. Alternatively, it is also possible to provide another optical system such as a lens for condensing the heat radiation from the halogen heater 84 onto the recorded surface of the paper Pa where the ink adheres to. Moreover, it can be made to dry the ink on the paper Pa more efficiently as a light/heat condensing optical system which includes a combination of such a reflective plate and a lens optical system.

As shown in FIG. 5, the heat insulation device 78 is provided between the recording head 70B and the halogen heater 84 in the head block 72, and is made to approach the recording head 70B. The heat insulation device 78 is of a plate-shaped member made of a material superior in heat radiation performance, such as an aluminum alloy, or a heat-resistance plastic material together with a material superior in heat radiation performance such as an aluminum sheet stacked thereonto.

The heat insulation device 78 has a pipe-like shape with an approximately rectangular sectional shape, and has an air layer 80 therein extending along the direction along which the jetting nozzles of the recording head 70B are arranged. Further, the top and bottom ends thereof are open to the outside thereof, respectively.

Accordingly, the heat transmission to the recording head 70B of the heat generated by the halogen heater 84 is blocked thereby, and, thus, temperature rise in the recording heads 70C through 70B by the halogen heater is effectively avoided. Moreover, the heat emitted from the halogen heater 84 is transmitted to the heat insulation device 78 by the reflective plate 82, and also, then, it radiates therefrom.

Next, features of the embodiment of the present invention will now be described using FIG. 6.

Figure 6:
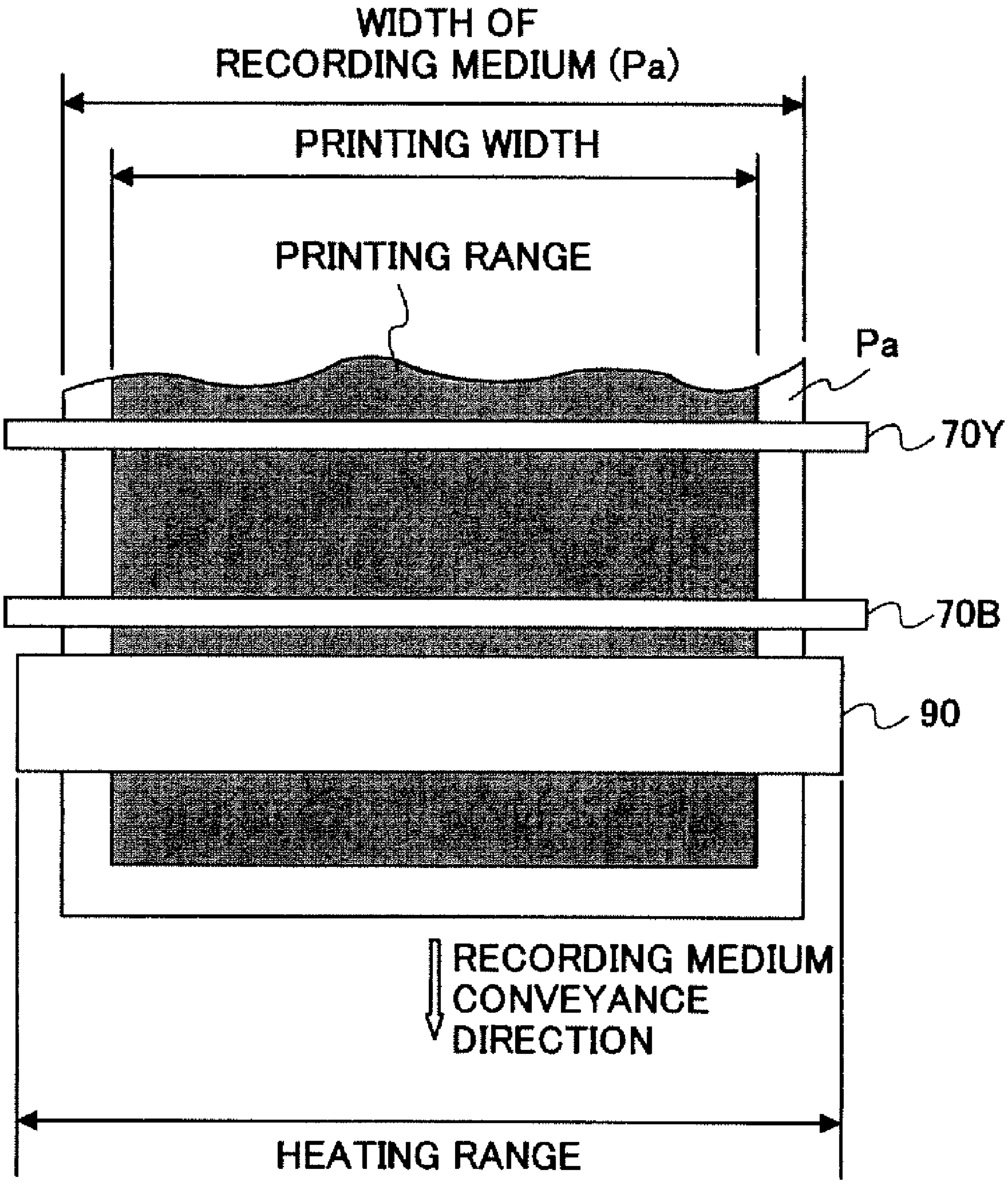
FIG. 6 illustrates a relation between a heating part and a printing range according to the present invention.

FIG. 6 shows a partial typical view of the recording part 70 taken along an arrow A of FIG. 5 in the multi-nozzle-type ink-jet recording device having a long dimension so that the plurality of jetting nozzles shown in FIG. 1 can cover the printing range of the recording medium.

As can be seen from FIG. 6, the heating unit in the form of heating-type ink fixing device 76 covers the wider range than the printing range of the recording medium Pa printed by the long-dimension multi-nozzle-type recording heads 70Y and 70B. That is, since a margin exists in heating capability compared with a case where just the printing range is heated, when the range heated by the heating unit 90 is wider than the printing range, ink drying can be performed efficiently thereby. In addition, by making the range heated by the heating unit 90 wider than the width of the recording medium Pa as shown in FIG. 6, further effective heating is achievable.

Moreover, the heating-type ink fixing device 76 is provided at a position subsequent to the recording head 70B (the most downstream end of the conveyance path of the recording medium Pa). However, it is also possible to provide a plurality of such heating units each at a position subsequent to and adjacent to each recording head 70C, 70M, 70Y and 70B. In such a case, it is possible to dry immediately after printing with each color ink is finished, and, thus, it is possible to prevent the respective color inks from being mixed before being dried. Otherwise, Such mixing of respective color inks may cause somber color and thus may cause image quality degradation in some case.

Furthermore, when another heating unit is allotted to the upstream side of the recording head 70C so that the recording medium Pa may be heated in advance before printing by the recording head 70C starts, more effective ink dryness can be performed.

Next, a second embodiment of the present invention will now be described using FIG. 7.

Figure 7:
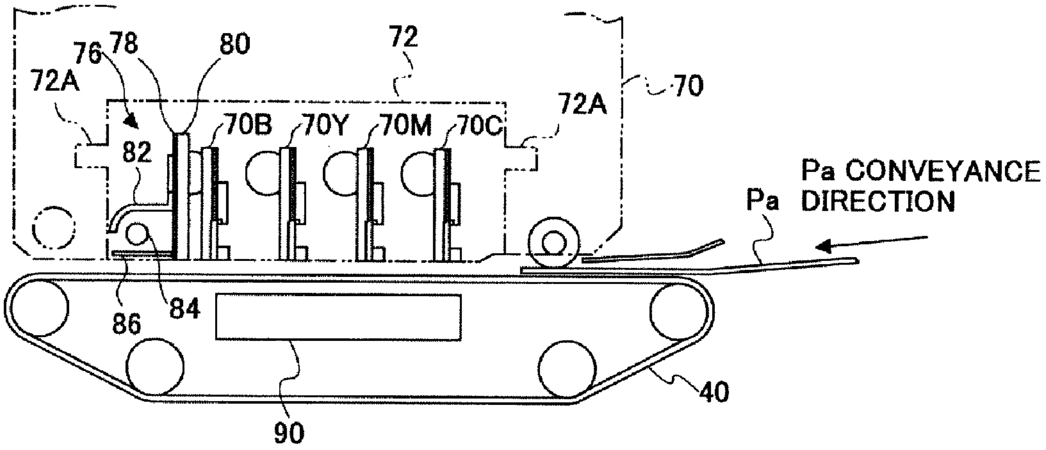
FIG. 7 shows a recording part containing a heating fixing device in another configuration according to the present invention.

FIG. 7 shows the second embodiment in which a rear heating unit 90 is additionally provided so that the recording medium Pa can be heated also from the opposite side of the printed surface. The rear heating unit 90 also covers the wider range than the printing range of the recording medium Pa while the heating range extends along the multi-nozzle sequence/row arrangement direction, and thus, effective heating can be achieved. Furthermore, more effective ink heating and dryness are realizable by making the range heated into a larger range than the width of the recording medium Pa.

Figure 8:
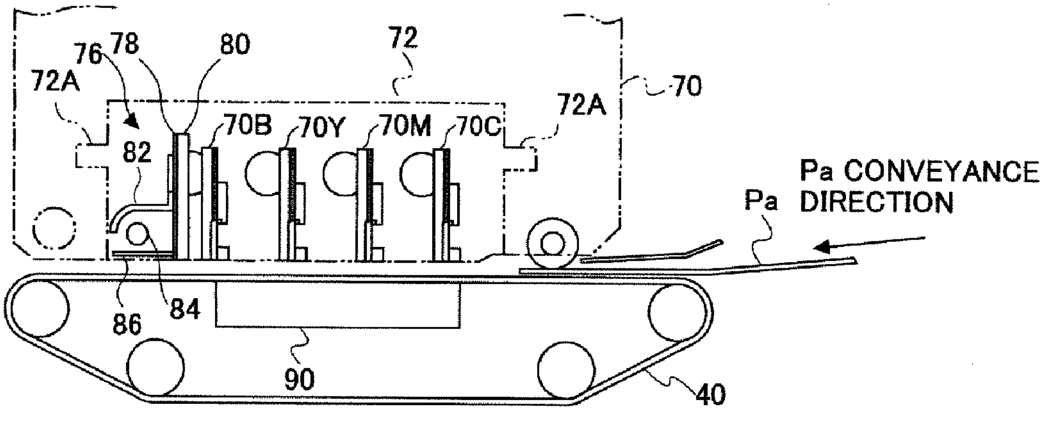
FIG. 8 shows a recording part according to the present invention which contains a heating fixing device in another configuration.

FIG. 8 shows a third embodiment of the present invention in which such a rear heating unit 90 is made in contact with the conveyance belt 40, and thus is made to perform heating and dryness more effectively.

In this case, heating is made directly by means of the conveyance belt 40 which conveys the recording medium Pa. However, it is also possible to replace the conveyance belt 40 by another conveyance unit, for example, a drum structure (or a roller), and the recording medium Pa is directly heated by using the drum (roller) itself as a heating drum (roller). Thereby, still more effective heating and dryness is possible.

Figure 9:
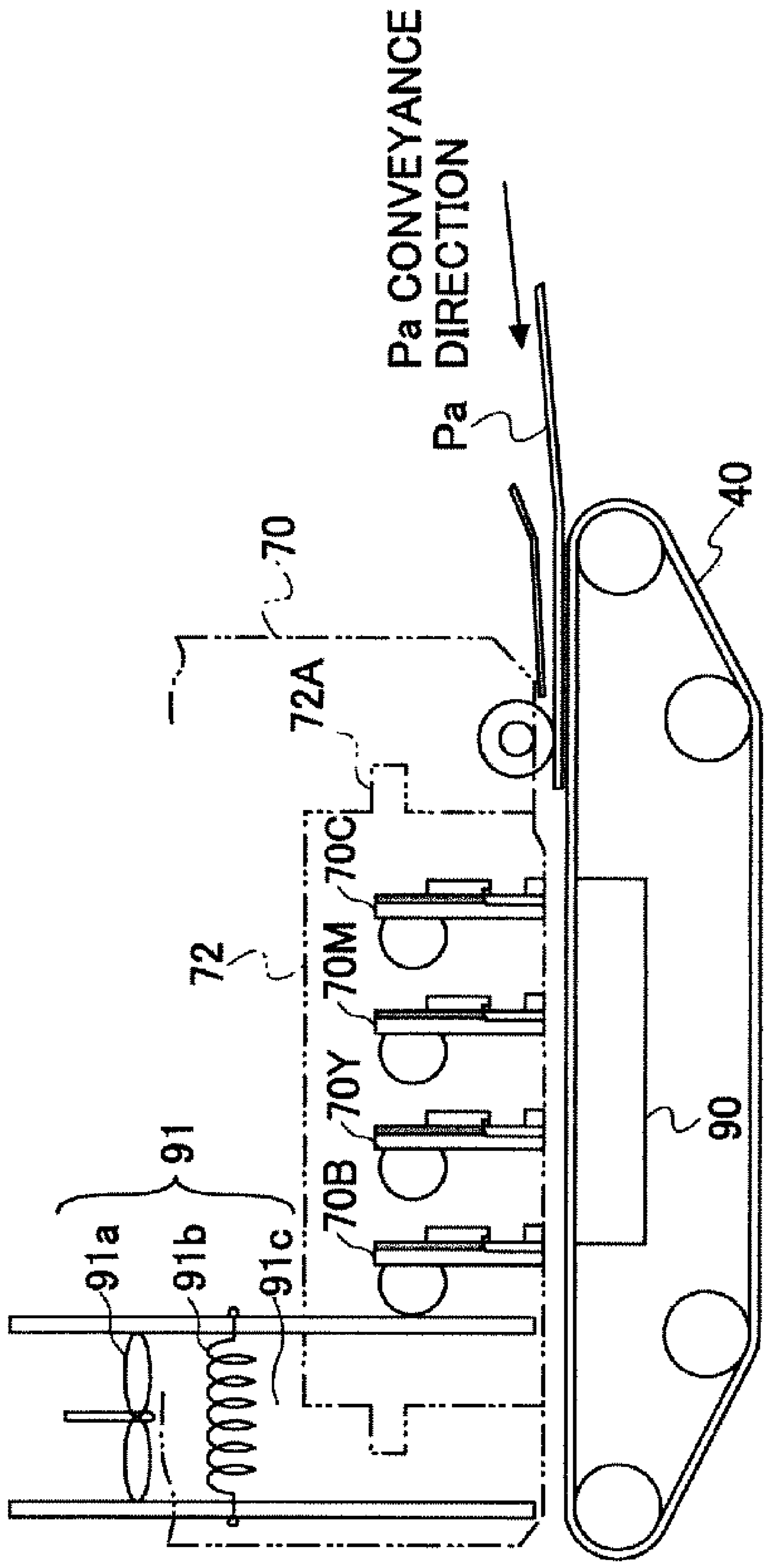
FIG. 9 shows a recording part according to the present invention which includes a warm air applying part.

FIG. 9 illustrates a fourth embodiment of the present invention. In this embodiment, printing is made in the order of C, M, Y and B (the ink of cyan, magenta, yellow and black), and, after that, a warm air applying unit 91 applies a heated air flow onto the printed surface of the paper sheet thus conveyed. Thus, a non-contact heating system is applied to evaporate the water in the ink, thus dry the ink, and, fix the same onto the paper sheet effectively.

Figure 10A:
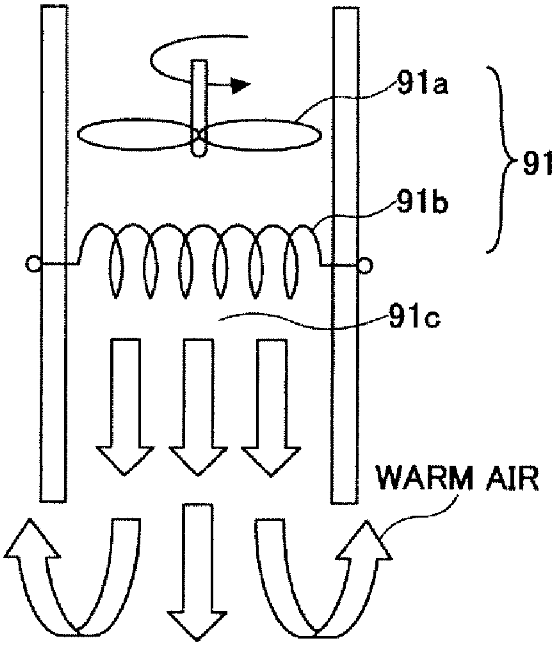
FIGS. 10A and 10B illustrate a detailed example of the warm air applying part according to the present invention.
Figure 10B:
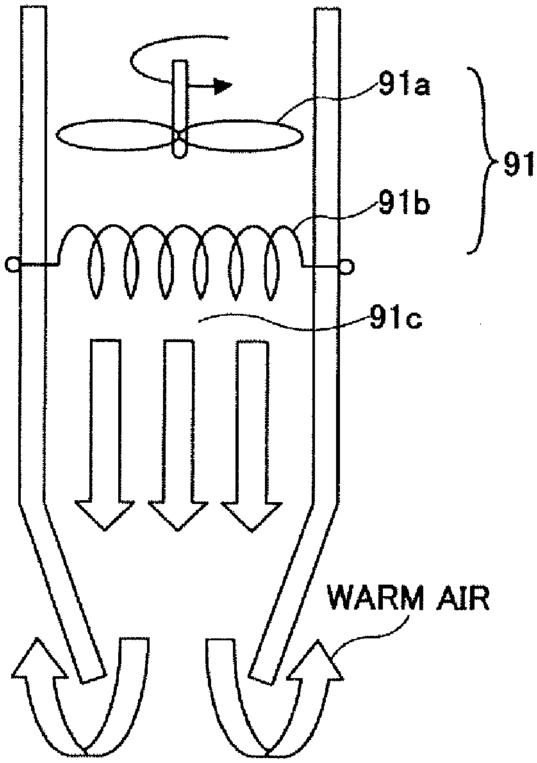

FIGS. 10A and 10B illustrate the above-mentioned warm air applying unit 91 which is preferably applied in the embodiment of the present invention. FIGS. 9, 10A and 10B illustrate the warm air applying unit 91 in a diagrammatic sketch, and basically, it includes a ventilation device 91*a*, a heating device 91*b*, and a warm air application zone (warm air ventilation mouth) 91*c*.

A fan as shown, a pump, a compressor, or an accumulator combined therewith may be applied as the ventilation device 91*a*. As the heating device 91*b*, one utilizing a Joule resistance heating system with a nichrome wire, a halogen lamp, a sheathed heater, a ceramic heater, or so may be applied.

The heating air flow (warm air) created by the combination of the ventilation device and heating device is applied to the printed surface on which the printing has been made via a slit opening (warm air mouth) 91*c* which extends along the direction perpendicular to this figure, in other words, along the direction along which the multi-nozzle row extends. The slit opening 91*c* is configured so as to cover a range wider than the printing width of the recording medium (paper), and, thus, the moisture in the ink can be evaporated effectively, and thus, drying and fixing of the ink can be made effectively.

The temperature of the heating air flow (warm air) should be hither than the temperature of the recording medium on which recording is made in order to evaporate the moisture in the ink more effectively and to perform drying and fixing of the ink effectively. The above-mentioned recording medium may be generally paper. However, a plastic sheet or so may also be applied as the recording medium on which printing is made. This is because the warm air applied is not so effective for moisture dryness if the temperature thereof is lower than the temperature of the recording medium.

According to the fourth embodiment of the present invention, the moisture in the ink is evaporated and the ink is dried and fixed onto the recording medium by means of the warm air applying unit. However, it is more effective to fix the ink onto the recording medium by combining such a warm air applying unit with the heating-type fixing device 76 as shown in FIG. 5, or the back side heating unit 90 described above with reference to FIG. 7 or FIG. 8. In this scheme, if the warm air applied is lower in the temperature than the surface of the recording medium on which recording has been made, effective drying may not be achieved since it is already heated by the above-mentioned heating-type fixing device 76 or the back side heating unit 90. Accordingly, the warm air applied should have a temperature higher than that of the recorded surface of the recording medium.

According to an experiment by the inventors, before printing or during printing, or after printing in a paper conveyance path, the recorded surface of the recording paper was heated into the temperature within a range between 40 and 65 degrees C. Then, after the printing, air heated into 70 through 150 degrees C. by means of a nichrome heating element was applied to the recorded surface of the recording paper by a fan. Thereby, a satisfactory printed matter was obtained such that, even when the printed matter thus-produced was stacked each other, no ink transfer to the back surface of another printed matter occurred.

Next, a fifth embodiment of the present invention will be described. According to the present invention, the ink which has not been dried yet on a recording medium (paper) is dried forcibly, is fixed thereto, or the ink which has not been permeated into the recording medium (paper) is forcibly dried and is fixed thereto. The above-mentioned ink which is not yet dried or not permeated into the paper temporarily forms an ink meniscus on the recording medium (paper). In other words, the ink has a dome-shape on the paper. Or, the ink is in a state, after a time has elapsed therefrom, in which the meniscus has been collapsed so as to become flattened, but is still wet.

When the warm air is applied to the ink in such a state, the ink is dried while the wet ink may scatter thereby so as to degrade the image quality of the thus-printed image depending on the conditions of the warm air application. According to the present invention, this problem is solved by determining conditions of the warm air application such that scattering of the wet ink is avoided and thus, image degradation is avoided.

Generally, air is viscous fluid and the air flow includes a laminar flow and a turbulent flow. Assuming an air flow within a pipe, an air flow in which fluid particles of each layer flow in the pipe in parallel with the tube axis is called a laminar flow, while an air flow which goes through the pipe while the fluid particles of each layer are mixed in a turbulent manner mutually and are mixed irregularly is called a turbulent flow. Thereby, when another fluid (such as ink drops, ink meniscus, etc.) exists in the turbulent flow, it is involved in the irregular flow and the fluid may scatter. As a result, scattering ink flies about, leading to degradation of the image quality in some case. Such a state should be avoided.

Quantitatively speaking, assuming that the dynamic viscosity is $\gamma$, the average fluid velocity is u and the inner diameter of the pipe is d, the laminar flow occurs when the non-dimensional value (called Reynolds number) obtained from the following formula is smaller than a fixed value while the turbulent flow occurs when the same value is more than the fixed value:

$$R=ud/\gamma$$

Moreover, the Reynolds number at which a change occurs from the laminar flow to the turbulent flow, or the vice versa is called critical Reynolds number (Rc), and this value is known as $$Rc=2310$$

by research of many scholars. Generally speaking the critical Reynolds number means the lower-limit Reynolds number. Also in this case, Rc means the lower-limit Reynolds number.

In order to achieve the laminar flow rather than the problematic turbulent flow, assuming that the inner diameter d of the pipe is 2 mm, the dynamic viscosity $\gamma$ of the air is approximately $235.1\times10^{-7}$ $m^2/s$ in the conditions of 1 atm and 100 degrees C. Then, the above-mentioned formula is transformed and these values are applied thereto, $$\begin{aligned} U &= Rc\times\gamma/d \\ &= 2310\times235.1\times10^{-7}(\mathrm{m^2/s})/2\ (\mathrm{mm}) \\ &\approx 27.2\ (\mathrm{m/s}) \end{aligned}$$

Thus, the laminar flow can be achieved when the air flow of approximately 27.2 m/s or less is created.

Then, according to the fifth embodiment of the present invention, pipes which satisfy the requirements such as to create the above-mentioned air flow are arranged in a range such as to cover a range wider than the printing range on the recording medium along the direction along which the multi-nozzle row extends in the recording head. In case of slit-type opening is applied instead of the pipes, the requirements should be changed strictly speaking. However, even in such a case, it is possible to apply similar requirements.

The above-mentioned example of calculation is an example, and the required size and shape of the opening and the required flow rate which achieve the above-mentioned lower-limit critical Reynolds number should be selected appropriately. FIGS. 10A and 10B illustrate two examples in which the size of the opening is made different therebetween.

In addition, since the apparatus itself becomes overheated when it is filled with the warm air thus created, erroneous operation of the electric system therein may occur. Or, in case the apparatus has a high airtight performance, the inside becomes much high in the air pressure, and, thus the warm air generation performance may be degraded accordingly. For the purpose of solving these problems, according to the fifth embodiment, an opening is formed in the apparatus with which the warm air can be effectively discharged externally.

A sixth embodiment of the present invention will now be described with reference to FIG. 11. According to the sixth embodiment, printing is made on both sides of each recording medium for the purpose of saving resources of the recording medium (mainly, it is made of paper). The recording medium for which printing on one side is made is then returned to the printing part again in which printing to the other side thereof is then performed.

Figure 11:
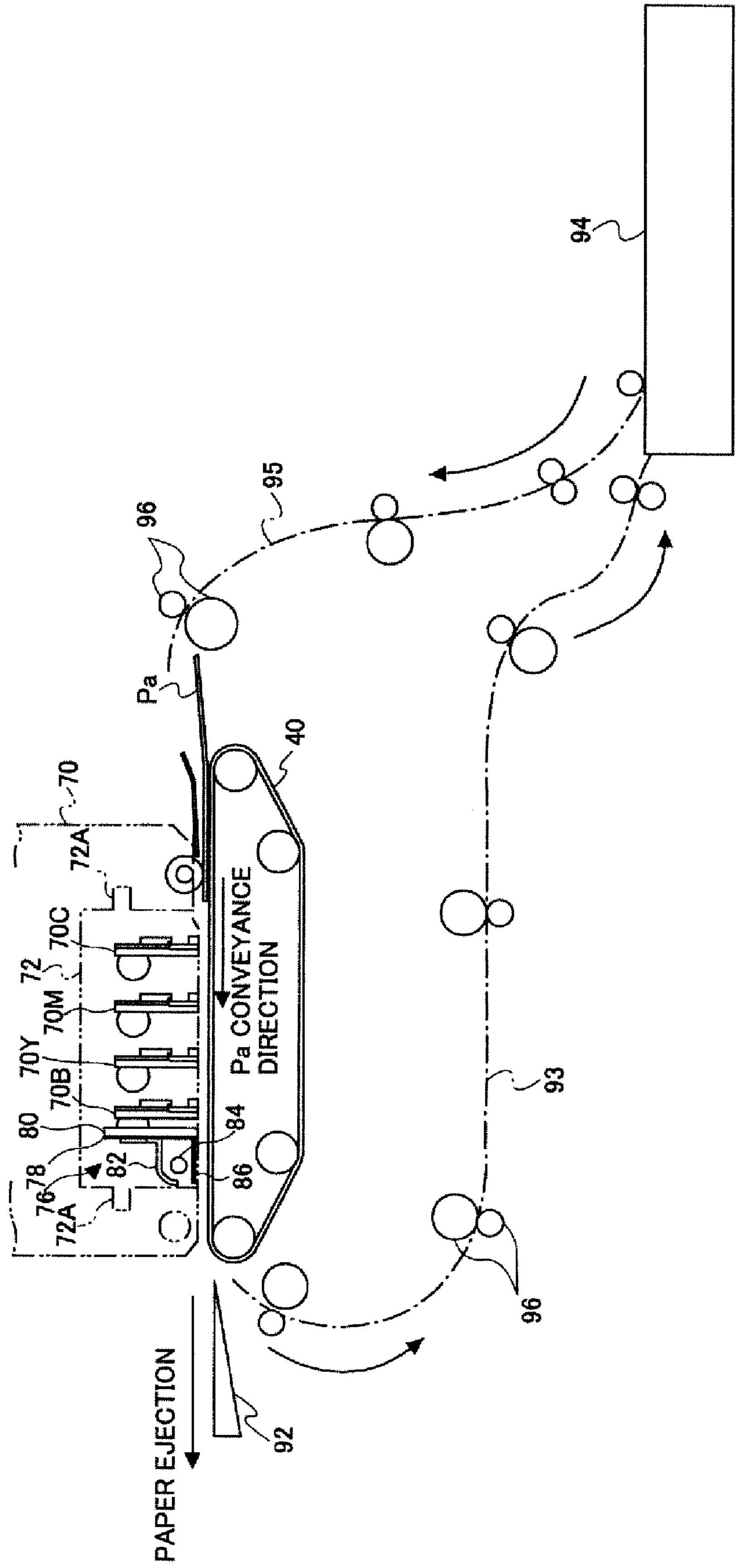
FIG. 11 illustrates a conveyance method for a recording medium at a time of performing a double side printing according to the present invention.

As shown in FIG. 11, a recording medium Pa conveyed along the Pa conveyance direction undergoes printing with the respective recording heads 70C, 70M, 70Y, and 70B. After that, depending on a particular occasion as to whether first side or second side printing is made in double side printing, or whether double or single side printing is made, conveyance path is separated into two ways. First, when only printing onto single side is made finally, the recording medium is ejected in the left-hand side, and thus, the printing operation is finished.

Next, in case of double side printing is performed, a signal is sent to a separation nail 92 shown, the separation nail 92 operates so that the recording medium coming is prevented from being ejected, but is conveyed into a double side printing conveyance path 93. After passing through the double side printing conveyance path 93, the recording medium is contained into a double side printing paper temporarily containing holder 94. As shown, when the recording medium is conveyed counterclockwise after separating from the separation nail 92, the printed side thereof is turned downward. Thereby, when it is contained into the double side printing paper temporarily containing tray 94, the printed side thereof faces downwards.

After that, when printing is made onto the other side of the recording medium, it is conveyed from the double side printing paper temporarily containing tray 94 for a double side printing conveyance path 95. As the already printed side faces downward already at this time as mentioned above, and, thus, as shown, the other side of the recording medium which is then to undergo printing faces the nozzle surfaces of the respective heads after passing through the double side printing conveyance path 95.

However, when the recording medium Pa conveyed through the double side printing conveyance path 95 undergoes next printing (printing on the reverse side), the vertical orientation of the recording medium has been reversed passing through the conveyance path 93. Accordingly, in order to make the printed images on both sides of the recording medium coincidence in the vertical orientations, the following operation is performed. That is, when the printing on the reverse side is performed, a memory is used for storing a page of image to be printed on the reverse side, and, in order that the printing is started from the bottom of the image, a printing control is made such that the image data is fed to the respective recording heads 70C, 70M, 70Y and 70B in the reverse sequence. Thereby, no special complicated mechanical conveyance mechanism for conveying the recording medium (paper) is needed for the purpose of achieving coincidence in the vertical orientations of the images printed on both sides but with the electric control.

Alternatively, it is also possible to rotate the orientation of the paper sheet which is conveyed into the double side printing paper temporarily containing tray 94 after undergoing printing on one side thereof by 180 degrees by means of a rotation control mechanism which is not shown in the double side printing paper temporarily containing tray 94. In case such a scheme is applied, it is not necessary to provide a printing control such as to supply image data in the reverse sequence for the purpose of achieving coincidence in the vertical orientations of the images printed on both sides.

Further alternatively, it is also possible to provide a conveyance path such that the recording medium passing through the double side printing conveyance path 93 is not led into the double side printing paper temporarily containing tray 94 but is led directly into the double side printing conveyance path 95, and, the thus-provided path continuing to the double side printing conveyance path 95 is twisted so that the recording medium (paper) is turned upside down by 180 degrees. In this scheme, it is not necessary to provide a printing control such as to supply image data in the reverse sequence for the purpose of achieving coincidence in the vertical orientations of the images printed on both sides but with the above-mentioned simple configuration in which the obverse/reverse orientations of the paper is naturally turned.

In any scheme, according to the sixth embodiment, it is possible to achieve coincidence in the vertical orientations of the images printed on both sides of the recording medium (paper).

Then, after the double side printing is thus made, the separation nail 92 is then not operated so that the relevant recording medium is ejected along the left-hand arrow shown, and, thus, the printing is finished. In FIG. 11, circles in large and smaller sizes represent conveyance rollers.

Next, a seventh embodiment of the present invention will be described. According to the present invention, as described above, the other side of the recording medium is conveyed into the printing part after once undergoing printing onto one side thereof via the double side printing conveyance path 93, double side printing paper temporarily containing tray 94 and double side printing conveyance path 95. At this time, a matter to be considered is drying the ink of the one side of the recording medium already undergoing the printing. Especially, according to the present invention, in which the multi-nozzle type is achieved so that the printing range of the recording medium is covered thereby, page printing is thus rapidly performed, and, therefore, a time interval for drying the ink on the one side cannot be given sufficiently. In other words, the recording head according to the present invention has such a high printing performance. Therefore, it is necessary to consider accelerating drying of the ink after printing according to the thus-improved printing performance.

According to the seventh embodiment of the present invention, in consideration of this problem, the conveyance of the recording medium Pa is temporarily stopped in the double side printing conveyance path 93 after the one side printing. Thereby, a time interval for drying the ink can be ensured. The specific time interval should be determined in consideration of whether natural drying or forcible drying (which will be described later) is applied, according to a configuration of the recording medium, the characteristics of the ink (quick drying type/non-quick drying type), or so. In addition, also in a serial printer type printing apparatus, in case of performing double side printing with the number of nozzles in a range between 500 nozzles and 1000 nozzles or more, and high-speed ink drying is required, the same consideration should be made, and the present invention can also be applied to such a type of printing apparatus.

Figure 12:
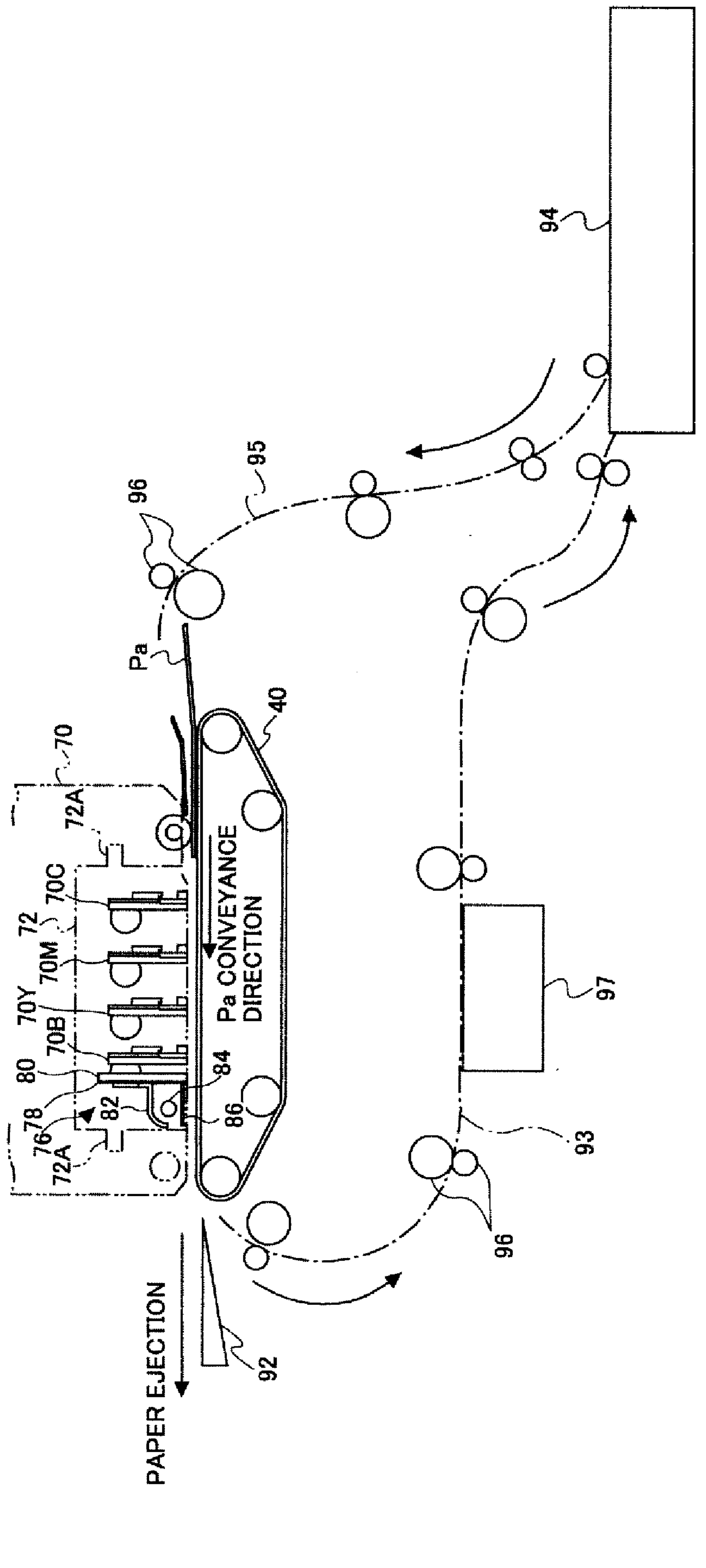
FIG. 12 shows an example in which a double side printing is performed according to the present invention while a heating device is provided therein.

Next, an eighth embodiment of the present invention will be described. FIG. 12 shows the eighth embodiment of the present invention in which a heating device 97 is provided in the double side printing conveyance path 93. The other configuration is same as that of the seventh embodiment described above with reference to FIG. 11. As the heating device 97, the above-mentioned thermal-type fixing device 76 (see FIG. 5), the above-mentioned warm air applying part 91 (see FIG. 10) or so may be applied preferably. It is more effective that a range heated by such a heating device 97 is made into a larger range than the width of the recording medium Pa. In addition, as mentioned above, drying of the ink by this heating device 97 may be effectively performed when conveyance of the recording medium Pa is temporarily stopped in front of the heating device 97. It is also possible to dry the ink on the recording medium Pa while it is being conveyed. Whether the drying by means of the heating device 97 is performed in a condition where the conveyance of the recording medium is stopped or continued should be determined also in consideration of the heating performance of the heating device 97, the configuration of the recording medium (described later), the characteristics of the ink (quick drying type or non-quick drying type), or so.

In addition, although, in this example shown, the heating device 97 is provided in the double side printing conveyance path 93, it is also possible that the same is provided rather in the double side printing conveyance path 95. Or it is provided rather in the double side printing paper temporarily containing tray 94, where the printed side of the recording medium may be dried while it is temporarily contained there. Furthermore, a plurality of the heating devices 97 may be provided.

Figure 13:
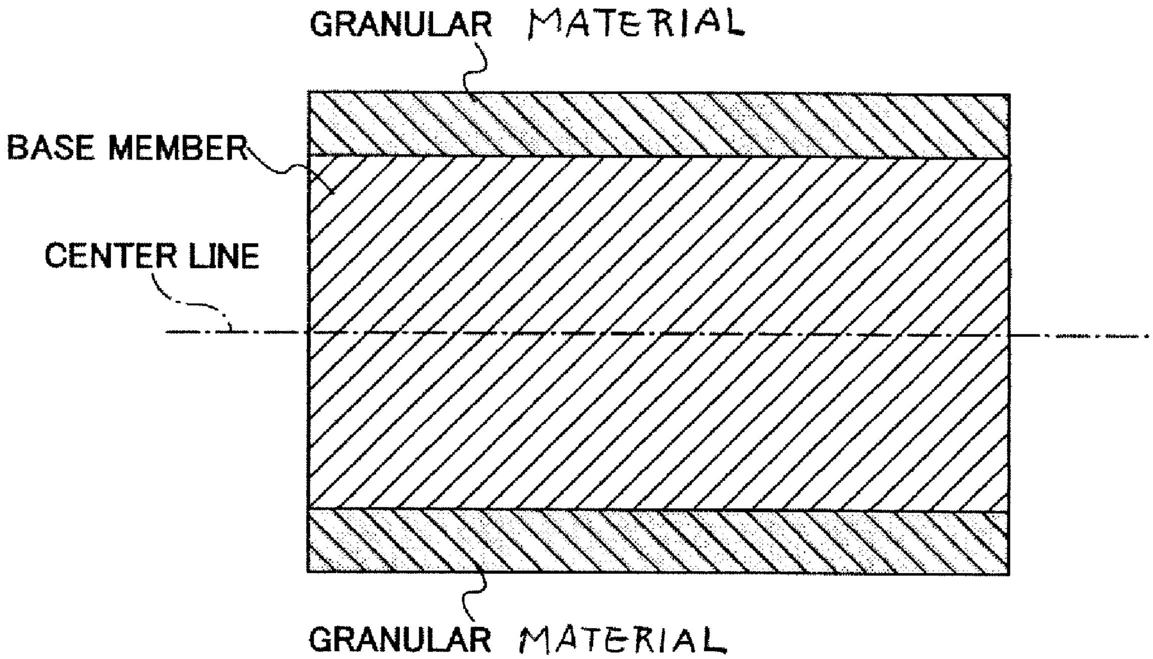
FIG. 13 illustrates a recording medium used for double side printing according to the present invention.

An embodiment of a recording medium according to the present invention will now be descried, which is applied in the printing/recording apparatus described above according to the present invention. In case of performing double side printing mentioned above, it is essential that high quality images are provided in both sides of recording medium after printing. In this view point, according to the embodiment of the present invention, as shown in FIG. 13 (side-elevational cross section), a recording medium used for double side printing has a configuration symmetrical between the obverse and reverse directions thereof.

In the description of the embodiment of recording medium according to the present invention, it is assumed that the recording medium is made of paper. According to the orthodox definition of paper, after vegetable fibers are made to suspend in water, the water is filtered out, and, then, the fibers are made to intertwine into a thin and flat shape. In other words, paper is a set of fibers obtained from decomposing a vegetable such as grass, wood, bamboo or so. Regardless of Western paper or Japanese paper, the materials of paper are cellulose fibers which have a special characteristic, and paper is obtained from processing these fibers with a special technique of paper manufacture technology so that they are made to be a thin layer.

In Western paper, the cellulose fiber used is a wood fiber with a length of 1 mm through 3 mm, a width of 20 micrometers through 40 micrometers and a thickness of 3 micrometers through 6 micrometers, and ten through hundred thereof are stacked together in a form of layers into a common paper. By applying such a configuration, paper has a special characteristic of being very cellulite, having high affinity originating from the cellulose, and having smooth surfaces. As to Japanese paper, the paper is also made of cellulose fibers, which are different from wood fibers but are bast fibers relatively thinner than the wood fibers (5 through 20 micrometers in width) having different characteristics in terms of molecular structure. The Japanese paper is classified into machine made paper and hand made paper. Thus, paper is made of cellulose fibers stacked together. Accordingly, some gaps occur therein between the respective fibers.

The definition of paper is as described above. However, paper made of cellulose fibers stacked is so-called base paper. Actually used paper is made of filling filler particles into the gap of fibers of the base paper, which filler particles have the particle diameter of 0.2 micrometers through 10 micrometers and are such as those of talc, clay, calcium carbonate, titanium dioxide, or so. In FIG. 13, a base member means the above-mentioned base paper or one obtained from filing talc, clay, calcium carbonate, titanium dioxide or so between fibers of the base paper.

Further, for a particular use, coated paper may be applied which is obtained from coating a coating liquid onto the paper surface, which coating liquid is obtained from dispersing particles having the particular diameter of 0.5 micrometers through 1 micrometers of china clay ($Al_2O_3.2SiO_2.2H_2O$), calcium carbonate ($CaCO_3$), satin white ($3CaO.Al_2O_3.3CaSO_4.31$ through $32H_2O$) or so together with binder such as latex or starch. The granular material according to the present invention means such a material, and, as shown in the figure, it is applied to the top and bottom (obverse and reverse sides) by approximately equal amounts, the thus-obtained paper is thus made to have ink absorbance characteristics equivalent between the obverse and reverse sides, and high quality images could thus be obtained in manner of equivalent between the obverse and reverse sides thereof.

Other than paper, a recording medium according to the present invention may have another configuration. For example, instead, a resin sheet such as a polyethylene film or so may be applied as the base member, as in an OHP sheet, and thereon, a coating liquid is coated by approximately same amounts the between obverse and reverse sides, which coating liquid is, as mentioned above, obtained from dispersing particles having the particular diameter of 0.5 micrometers through 1 micrometers of china clay ($Al_2O_3.2SiO_2.2H_2O$), calcium carbonate ($CaCO_3$), satin white ($3CaO.Al_2O_3.3CaSO_4.31$ through $32H_2O$) or so together with binder such as latex or starch.

In any way, an essential matter of a recording medium according to the present invention is that a granular material is coated in a manner such that the thus-coated granular material becomes symmetrical between the top and bottom with respect to the center line of the base member, as shown in FIG. 13, and, thus, high quality images could be obtained in manner of equivalent between the obverse and reverse sides thereof.

As other types of paper, there are the following types of paper: newspaper rolling paper, non-coated printing paper (respective types of printing paper of upper class, middle class, lower class, tissue paper and so forth), lightly coated printing paper (lightly coated wood free paper, lightly coated printing paper and so forth), coated printing paper (art paper, coated paper and so forth), information paper (copying paper, sensitizing paper, form paper, PPC paper, thermographic paper and so forth), wrapping paper (craft paper, simili paper, and so forth), sanitary paper (tissue paper, toilet paper, towel paper and so forth), other variable types of paper (architectural paper, laminated paper, condenser paper, rice paper, glassine paper, and so forth), corrugated fiberboard paper (liner board, corrugating medium and so forth), and so forth.

On the surface of any type of paper mentioned above formed of stacking of cellulose fibers together have unevenness in the surfaces microscopically depending on the thickness of the cellulose fibers, the gaps formed between the fibers stacked, and, in a case of coated paper mentioned above, depending on the size of particles of the coating matter, or so. Such a microscopic unevenness shape may be a serious factor of degrading image quality in case of performing high image quality recording in use of very minute nozzles such as those having the cross sectional area of 10 $\mu m^2$ through 600 $\mu m^2$ which are arranged in a very high density of 400 dpi through 3200 dpi.

As described above, generally speaking, the cellulose fibers have the width (thickness) of 5 micrometers through 40 micrometers depending on the type of paper. However, paper is not made of such thick fibers as they are finally, but, generally speaking, during a paper manufacture process, with so-called beating, a mechanical force is applied to the fibers, and, thus, the fibers are made flexible. Accordingly, actually, the thickness of paper fibers are smaller than the above-mentioned value finally. In common, after undergoing the beating process, the thickness of fibers of paper becomes on the order of 3 micrometers through 6 micrometers.

According to the present invention, granular material is applied so as to make smoother the surface aspect (unevenness on the surfaces, normally, on the order of 5 micrometers through 10 micrometers, caused by fibers of paper manufactured undergoing the beating, stacked on top of each other). Thereby, the above-mentioned unevenness of 5 micrometers through 10 micrometers is made into one less than 1 micrometers through 2 micrometers, and, thus, high quality image recording can be achieved thereon.

As another quality required on the recording medium applicable to the present invention, other than that of achieving high image quality equal between the top and bottom of the paper, it is necessary that blurring of ink is prevented from passing through between the obverse and reverse sides, or the ink on one side is prevented from blurring into the other side (or, it is necessary that such blurring should not be found out visually). According to the present invention, in this view point, the recording medium applicable to the present invention should satisfy the following requirements of the thickness of the base member and the coating amount of the granular material. That is, specifically, for example, the thickness of the base member falls within a range between 100 micrometers through 500 micrometers, and, as the granular material, calcium carbonate ($CaCO_3$) having the granular diameter of 1 micrometer should be coated by the amount falling within a range between 10 $g/m^2$ and 100 $g/m^2$ on each of both sides. Furthermore, as to the base member, not only simple pure cellulose fibers, but also one which is filled with the above-mentioned filler particles filled into the gaps occurring between the fibers may be applied. Thereby, it is possible to reduce the thickness of the base member, and also, to reduce the amount of the granular material to be coated on both sides thereof.

Next, a configuration of a whole ink-jet copying machine or copier having the heating-type ink fixing device in one of the above-mentioned embodiments of the present invention will be described.

Generally, a so-called copying machine may be of an electrophotographic type. Although such an electrophotographic type machine has spread widely, in many cases, this type of copying machine may be relatively complicated and also may be relatively large-scaled. In contrast thereto, an ink-jet type recording system is simple in terms of its principle, and, thus, by applying this principle to a copying machine, it should be possible to realize a remarkably simple novel copying machine.

Figure 14:
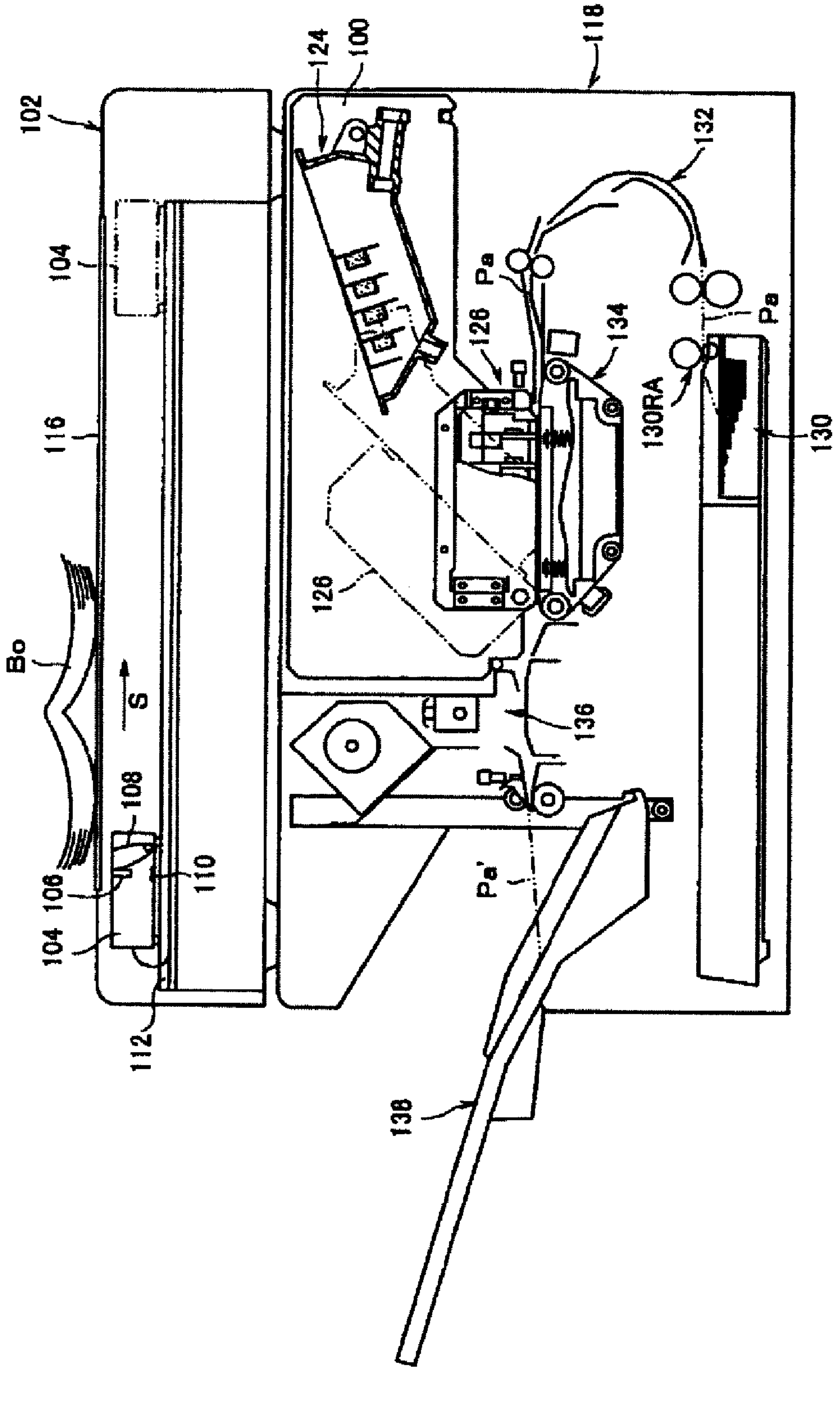
FIG. 14 shows an ink-jet copier using a principle according to the present invention.

FIG. 14 shows a side-elevational sectional view of an ink-jet copying machine in a ninth embodiment of the present invention.

In FIG. 14, the ink-jet copying machine includes a scanner part 102, a recording part 126, a conveyance part 134, an ejecting paper conveyance part 136, a feeding paper conveyance part 132, and a recovery processing device 124.

The scanner part 102 reads an image of an original Bo placed on an original stand 116. The recording part 126 jets ink and makes it adhere to a recording surface of a paper Pa as a recording medium in sequence based on the image data supplied from the scanner part 102 which generates the image data. The conveyance part 134 is allotted on the downstream side of the recording part 126 which performs the recording operation, and conveys the paper Pa in predetermined timing according to the recording operation of the recording part 126, to the ejection paper conveyance part 136. The ejection paper conveyance part 136 ejects the printed paper Pa' which is conveyed by the conveyance part 134 onto an ejection tray part 138. The feeding paper conveyance part 132 conveys one sheet of paper Pa from a feeding part 130 to the recording part 126 at a time. The recovery processing device 124 performs predetermined recovery processing selectively onto each recording head of the recording part 126.

The scanner part 102 includes an original scanning unit 104, a guide rail 112, and a driving unit (not shown in the figure). The original scanning unit reads an image of the original Bo which should be copied as mentioned above. The guide rail 112 supports the original scanning unit movably along a direction indicated by an arrow S in the figure, and also, movably along the opposite direction. The driving unit drives the original scanning unit 104 so as to realize going and returning operation thereof between a position shown by a solid line and a position shown by a broken chain line at a predetermined speed.

The original scanning unit 104 mainly includes a rod-array lens 106, an line sensor 110 of a unity-magnification color decomposition type as a color image sensor for reading color information, and an exposure unit 108.

When the original scanning unit 104 is moved along the arrow S so as to read the image on the original Bo placed on the original stand made of a transparent material, a lamp of the exposure unit 108 is turned on, and, the reflected light from the original is condensed onto the line sensor 110 through guidance by the rod array lens 106. The line sensor 110 reads the color image information of the reflected light for each color component, converts it into an electric signal, and provides the signal to a control unit of an ink-jet printer part 118. The recording head for each color component in the recording part 126 jets recording liquid, for example, ink of a predetermined different color according to a driving control pulse signal produced based on the thus-produced image data.

When a drive motor, not shown in the figure, is made into an operation state, one sheet of paper Pa in a predetermined standard size loaded in the feeding part 130 is taken out at a time by a pickup roller unit 130RA, and is supplied to the feeding paper conveyance part 132.

Also in such a copier applying the ink-jet principle, the above-mentioned warm air applying unit is employed, and, thus, drying and fixing of the ink is performed in an optimum condition. Further, according to the present invention, the opening is provided in the copier by which the warm air provided by the warm air applying unit is discharged externally as mentioned above. Otherwise, if the copier is filled with the warm air, the machine itself may enter an over-heated condition, whereby mal-operation of the eclectic system therein may occur. Or, if the airtight performance of the machine is very high, the above-mentioned warm air may cause a high pressure in the machine, whereby the warm air generation performance of the warm air applying unit may be degraded. Therefore, by providing the opening as mentioned above, the warm air is effectively discharged externally, and, thus, the above-mentioned problems are solved.

Figure 15:
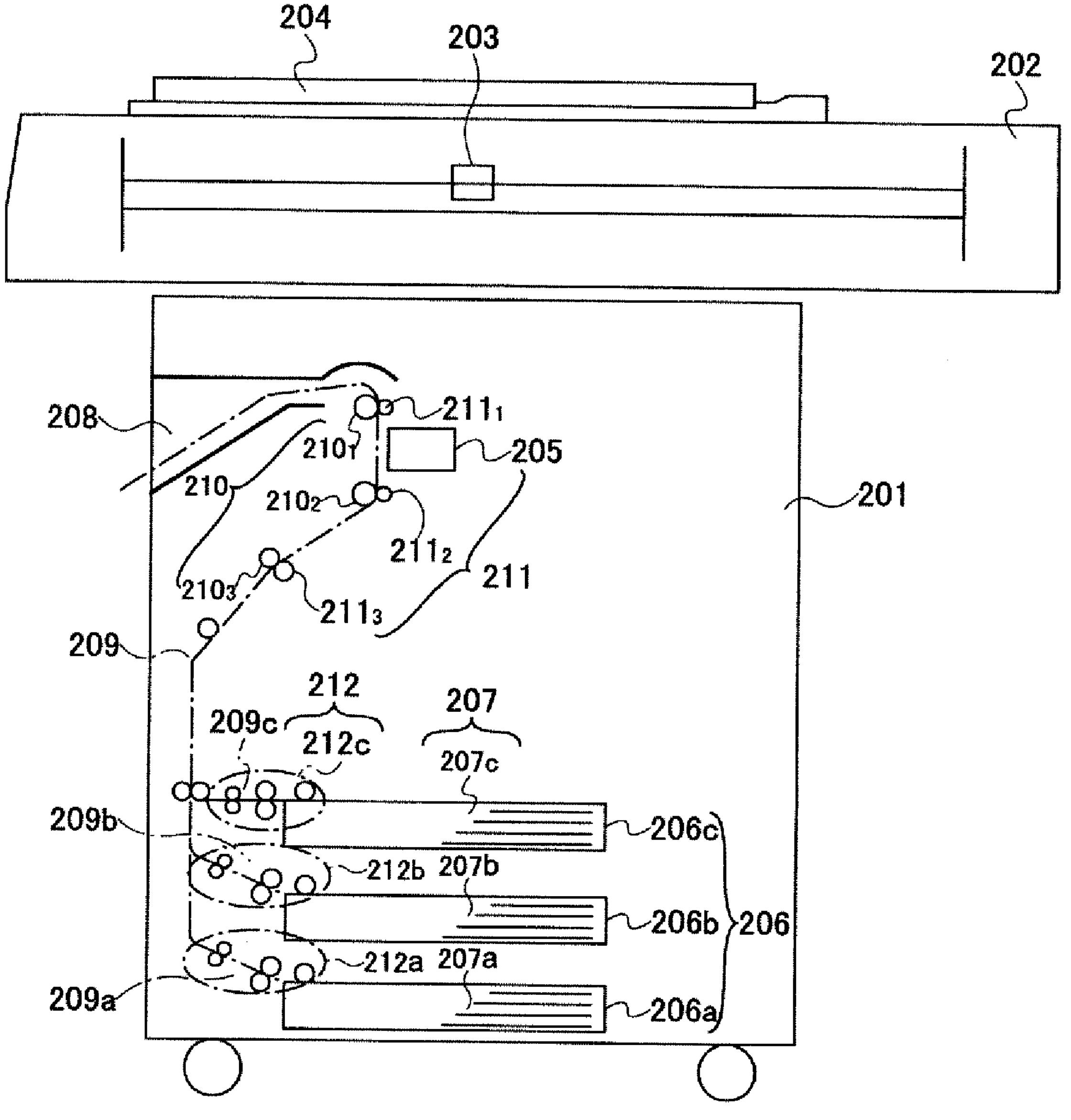
FIG. 15 shows another example of an ink-jet copier using the principle according to the present invention.

FIG. 15 shows another example of an ink-jet copier 201 according to a tenth embodiment of the present invention. As shown, the machine 201 includes an original table 202, a scanner 203, an original fastener 204, a color ink-jet head unit 205, paper feeding cassettes 206 (206*a*, 206*b*, 206*c*) for feeding recording media 207 (207*a*, 207*b*, 207*c*), paper ejecting mouth 208, platen rollers 210 ($\mathbf{210}_1$, $\mathbf{210}_2$, $\mathbf{210}_3$), pressing rollers 211 ($\mathbf{211}_1$, $\mathbf{211}_2$, $\mathbf{211}_3$), and paper feeding rollers 212 ($\mathbf{212}_1$, $\mathbf{212}_2$, $\mathbf{212}_3$). The recording medium (207*a*, 207*b*, or 207*c*) provided from any one of the respective paper feeding cassettes (206*a*, 206*b*, 206*c*) passes through a respective one of paths (paper passing paths) 209*a*, 209*b* and 209*c*, indicated by chain lines, then passes through a path 209 at which these three paths merge, and, thus is conveyed into the color ink-jet head unit 205.

Each of FIGS. 14 and 15 are diagrams for illustrating the respective features, and the double side printing conveyance path 93, double side printing paper temporarily containing tray 94, double side printing conveyance path 95, and so forth described with reference to FIGS. 11 and 12 are omitted for the purpose of simplifying the figures.

Furthermore, the embodiment shown in FIG. 15 is a so-called copier-type ink-jet recording apparatus (ink-jet copier or copying machine) in which printing or recording is performed with an image signal supplied from the scanner 203. The present invention may also be applied to a so-called printer-type ink-jet recording apparatus in which printing or recording is performed with an image signal which is supplied by a host computer or so, not shown, connected externally to the machine.

As shown in FIG. 15, according to the present invention, a plurality of recording medium containing members may be provided (three in this embodiment). As described above, according to the present invention, double side printing is achievable. As mentioned above, a recording medium which is used for double side printing may have a special configuration symmetrical between the obverse and reverse sides. On the other hand, a recording medium which is merely used for a single side printing may not necessarily have such a special symmetrical configuration. Such two types of recording media may be handled in a signal recording apparatus according to the present invention. However, these different types of recording media may generally have similar configuration for an operator's eyes. Accordingly, there may occur an accident in which, even for the purpose of performing double side printing, a recording medium not specially provided for double side printing but one for a single side printing is supplied erroneously.

According to the present invention, in order to solve this problem, the above-mentioned plurality of recording medium containing members are configured to be easily distinguishable for an operator's eyes. For example, at least first one of the three recording medium containing members has a shape which is different from those of the other two second and third recording medium containing members. Then, recording media specially provided for double side printing, i.e., configured to have a structure symmetrical between the obverse and reverse sides, are contained in the first recording medium containing member, while recording media provided for single side printing are contained in the second and third recording medium containing members. In order to achieve the first recording medium containing member distinguishable from the second and third ones as mentioned above, not only a method of making the shape thereof different but also a method of making the color thereof different, or a method of making the surface aspect thereof (purposeful unevenness or so) different may be applied appropriately.

Furthermore, in the embodiment shown in FIG. 15, the recording medium containing members are stacked vertically on top of each other. In such a case, it is possible to previously determine that recording media specially provided for double side printing should be contained into the bottom stage of the recording medium containing member without fail. Then, information indicating this matter is previously registered in a CPU of the ink-jet copier. Thereby, it is possible to avoid erroneous application of recording media. As a result, a problematic situation in which erroneous printing applying erroneous recording medium results in that the recording medium thus printed should be discarded can be positively avoided.

Although the description has been made assuming ink-jet copier, a basic concept of the present invention to achieve a recording medium containing member for containing recording media specially provided for double side printing to be distinguishable from other recording medium containing members may also be applied to an ink-jet recording apparatus (ink-jet printer) not having a scanner function but having a function of double side printing and having a plurality of recording medium containing members.

Further, the present invention is not limited to the above-described embodiments, and variations and modifications may be made without departing from the basic concept of the present invention.

The present application is based on Japanese priority applications Nos. 2002-307539 and 2003-201191, filed on Oct. 22, 2002 and Jul. 24, 2003, respectively, the entire contents of which are hereby incorporated by reference.

What is claimed is:

1. A both-side-printing color thermal inkjet recording device, which carries out recording with thermally-generated bubbles, the both-side-printing color thermal inkjet recording device comprising:

a recording part configured to perform recording on a printing surface of a recording medium, said recording part including plural color inkjet recording heads configured to jet color ink drops of respective plural colors, each of the plural color ink jet recording heads being multi-nozzle-type and thermal, and including plural heating elements arranged in a density in a range of 400 dpi through 3200 dpi, and nozzles corresponding to the heating elements and having a cross-sectional area in a range of 10 $\mu m^2$ through 600 $\mu m^2$, and each of the multi-nozzle-type thermal color ink jet recording heads being configured to jet the color ink drops on demand, wherein jetting of ink drops is carried out in a manner in which bubbles generated by the heating elements are caused to project ink outward from the nozzles;

a treatment applying part configured to provide a treatment liquid to the printing surface of the recording medium before printing by jetting the ink drops, the treatment liquid insolubilizing the ink, or preventing a dot of the ink drop from spreading or running much on the recording medium;

a first conveying part configured to convey the recording medium to a position facing nozzle surfaces of the plural color inkjet recording heads, and for recording on one side of the recording medium by said recording part;

a second conveying part, including said first conveying part, configured to convey the recording medium, after the recording on one side of the recording medium is performed by said recording part, to the position facing the nozzle surfaces for printing on the other side of the recording medium; and a double-sided printing control part configured to enable printing images on both sides of the recording medium in a manner in which vertical orientations of the images on both sides of the recording medium coincide with each other.

2. The both-side-printing color thermal ink-jet recording device as claimed in claim 1, wherein the recording medium includes a base member that comprises cellulose fibers, and the base member has a selected thickness and granular material of a selected amount is coated on one side or both sides of the base member so that, after printing, printed image of ink is prevented from passing through from one side of the base member to the other side of the base member.

3. The both-side-printing color thermal inkjet recording device as claimed in claim 1, wherein the recording medium is conveyed by the second conveying part and the first conveying part in the second conveying part, after the recording on the one side of the recording medium is performed by the recording part, such that a reversed side of the recording medium that is opposite to the one side that has been printed on, faces the nozzle surfaces at the position.

4. A both-side-printing color thermal ink-jet recording device, which carries out recording with thermally-generated bubbles, the both-side-printing color thermal ink-jet recording device comprising:

a recording part configured to perform recording on a printing surface of a recording medium, said recording part including plural color ink-jet recording heads configured to jet color ink drops of respective plural colors, each of the plural color ink jet recording heads being multi-nozzle-type and thermal, and including plural heating elements arranged in a density in a range of 400 dpi through 3200 dpi, and nozzles corresponding to the heating elements and having a cross-sectional area in a range of 10 $\mu m^2$ through 600 $\mu m^2$, and each of the multi-nozzle-type thermal color ink jet recording heads being configured to jet the color ink drops on demand, wherein jetting of ink drops is carried out in a manner in which bubbles generated by the heating elements are caused to project ink outward from the nozzles;

a treatment applying part configured to provide a treatment liquid to the printing surface of the recording medium before printing by jetting the ink drops, the treatment liquid insolubilizing the ink, or preventing a dot of the ink drop from spreading or running much on the recording medium;

a first conveying part configured to convey the recording medium to a position facing nozzle surfaces of the plural color ink-jet recording heads, and for recording on one side of the recording medium by said recording part;

a second conveying part, including said first conveying part, configured to convey the recording medium, after the recording on one side of the recording medium is performed by said recording part, to the position facing the nozzle surfaces for printing on the other side of the recording medium;

a double-sided printing control part configured to enable printing images on both sides of the recording medium in a manner in which vertical orientations of the images on both sides of the recording medium coincide with each other; and a scanner part including an original table made of a transparent material, an exposure part configured to irradiate light from a light source to an original image on the original table, a moving part configured to move the exposure part for scanning, a sensor part configured to receive reflected light from the original image, convert the received light into color image information, and convert the color image information into a digital signal, and a control part configured to cause the ink drops of the plural colors to be jetted to and adhere to a recording surface of the recording medium based on said digital signal from the sensor part.

5. The both-side-printing color thermal inkjet recording device as claimed in claim 4, wherein the recording medium includes a base member that comprises cellulose fibers, and the base member has a selected thickness and granular material of a selected amount is coated on one side or both sides of the base member so that, after printing, printed image of ink is prevented from passing through from one side of the base member to the other side of the base member.

6. A both-side-printing color thermal ink jet recording device, which carries out recording with thermally-generated bubbles, the both-side-printing color thermal ink jet recording device comprising:

a recording part configured to perform recording on a printing surface of a recording medium, said recording part including plural color ink-jet recording heads configured to jet color ink drops of respective plural colors, each of the plural color ink jet recording heads being multi-nozzle-type and thermal, and including plural heating elements arranged in a density in a range of 400 dpi through 3200 dpi, and nozzles corresponding to the heating elements and having a cross-sectional area in a range of 10 $\mu m^2$ through 600 $\mu m^2$, and each of the multi-nozzle-type thermal color ink jet recording heads being configured to jet the color ink drops on demand, wherein jetting of ink drops is carried out in a manner in which bubbles generated by the heating elements are caused to project ink outward from the nozzles;

a treatment applying part configured to provide a treatment liquid to the printing surface of the recording medium before printing by jetting the ink drops, the treatment liquid insolubilizing the ink, or preventing a dot of the ink drop from spreading or running much on the recording medium;

a first conveying part configured to convey the recording medium to a position facing nozzle surfaces of the plural color ink-jet recording heads, and for recording on one side of the recording medium by said recording part;

a second conveying part, including said first conveying part, configured to convey the recording medium, after the recording on one side of the recording medium is performed by said recording part, to the position facing the nozzle surfaces for printing on the other side of the recording medium;

a double-sided printing control part configured to enable printing images on both sides of the recording medium in a manner in which vertical orientations of the images on both sides of the recording medium coincide with each other; and a scanner part including an original table made of a transparent material, an exposure part configured to irradiate light from a light source to an original image on the original table, a moving part configured to move the exposure part for scanning, a sensor part configured to receive reflected light from the original image and convert the received light into color image information, and a control part configured to convert the color image information into a digital signal and cause the ink drops of the plural colors to be jetted to and adhere to a recording surface of the recording medium based on said digital signal.

7. The both-side-printing color thermal ink-jet recording device as claimed in claim 6, wherein the recording medium includes a base member that comprises cellulose fibers, and the base member has a selected thickness and granular material of a selected amount is coated on one side or both sides of the base member so that, after printing, printed image of ink is prevented from passing through from one side of the base member to the other side of the base member.

* * * * *